(12) United States Patent
Zhou et al.

(10) Patent No.: US 11,863,078 B2
(45) Date of Patent: Jan. 2, 2024

(54) APPARATUS AND METHOD FOR DC-TO-DC CONVERSION

(71) Applicant: AcLeap Power Inc., Taipei (TW)

(72) Inventors: Lishen Zhou, Shanghai (CN); Qixue Yu, Shanghai (CN); Xiaojian Zhao, Shanghai (CN); Yifeng Sun, Shanghai (CN)

(73) Assignee: AcLeap Power Inc., Taipei (TW)

( * ) Notice: Subject to any disclaimer, the term of this patent is extended or adjusted under 35 U.S.C. 154(b) by 0 days.

(21) Appl. No.: 17/756,561

(22) PCT Filed: Nov. 29, 2019

(86) PCT No.: PCT/CN2019/122155
§ 371 (c)(1),
(2) Date: May 26, 2022

(87) PCT Pub. No.: WO2021/102987
PCT Pub. Date: Jun. 3, 2021

(65) Prior Publication Data
US 2022/0376628 A1    Nov. 24, 2022

(51) Int. Cl.
*H02M 3/335* (2006.01)
*H02M 1/00* (2006.01)

(52) U.S. Cl.
CPC ..... *H02M 3/33576* (2013.01); *H02M 1/0064* (2021.05); *H02M 3/33592* (2013.01)

(58) Field of Classification Search
CPC ......... H02M 3/33507; H02M 3/33523; H02M 3/33576; H02M 3/33592
See application file for complete search history.

(56) References Cited

U.S. PATENT DOCUMENTS

| | | | |
|---|---|---|---|
| 6,833,635 B2 * | 12/2004 | Kippley | H02J 9/062 307/83 |
| 7,869,237 B1 * | 1/2011 | Schutten | H02M 3/33507 363/17 |
| 9,577,540 B1 * | 2/2017 | Xiong | H02M 3/33569 |
| 2003/0185026 A1 * | 10/2003 | Matsuda | H02M 3/285 363/71 |
| 2015/0092454 A1 | 4/2015 | Cohen | |

(Continued)

FOREIGN PATENT DOCUMENTS

CN    108075652 A    5/2018

OTHER PUBLICATIONS

International Search Report and Written Opinion, issued by the ISA/CN National Intellectual Property Administration, regarding corresponding patent application Serial No. PCT/CN2019/122155; dated Aug. 26, 2020; 9 pages.

*Primary Examiner* — Gary A Nash
(74) *Attorney, Agent, or Firm* — Armstrong Teasdale LLP

(57) ABSTRACT

Devices and methods for DC-to-DC conversion. The device includes a first transformer having a first winding at a primary side and a second winding at a secondary side. The device also includes a second transformer having a third winding at a primary side and a fourth winding at a secondary side. The device includes a controller configured to control a first current in the first winding of the first transformer and a second current in the third winding of the second transformer to flow in a first pattern, and to control the first current and the second current to flow in a second pattern.

28 Claims, 28 Drawing Sheets

(56) References Cited

U.S. PATENT DOCUMENTS

| | | | |
|---|---|---|---|
| 2015/0207424 A1* | 7/2015 | Okamoto | H02M 1/12 363/17 |
| 2018/0138815 A1 | 5/2018 | Yamada et al. | |
| 2018/0342958 A1* | 11/2018 | Ji | H02M 3/33571 |

* cited by examiner

APPARATUS AND METHOD FOR DC-TO-DC CONVERSION

CROSS-REFERENCE TO RELATED APPLICATIONS

This is a national stage application which claims priority to International patent application Serial No.: PCT/CN2019/122155, filed on Nov. 29, 2019; and which is herein incorporated by reference in its entirety.

FIELD

Embodiments of the present disclosure relate to an apparatus and a method for DC-to-DC conversion.

BACKGROUND

A DC-to-DC converter is a device for converting an input DC supply into a desired output DC supply for a load. The DC-to-DC converter has been widely used in various kinds of electronic devices or electrical appliances. Electric vehicles (EVs) have grown in use recently. EV chargers for supplying battery charging to the EVs have improved to help support this growth. The EV charger, as the DC-to-DC converter, needs to support a wide range of input and output voltages.

Customers of the EV charger desire high efficiency and power density. An LLC resonant converter is a promising candidate to meet these requirements at reasonable costs. The LLC resonant converter has several desired features, such as high power, high power density, and high efficiency.

In several applications, it is desirable for the EV charger to have the output voltage to vary a wide range. For example, the output voltage is required to vary between 150V to 1000V. Furthermore, it is desirable for the EV charger to have a constant output power under a specific range of the output voltage. For another example, the output power is required to maintain constant under the output voltage ranging from 300V to 1000V. However, typical LLC resonant converters are hard to meet the wide range of the output voltage and the constant output power.

Therefore, it is desirable to provide an improved solution for DC-to-DC conversion capable of supporting the wide range of the output voltage as well as the constant output power.

SUMMARY

Embodiments of the present disclosure are directed to an apparatus and a method for DC-to-DC conversion, which is capable of providing the wide range of the output voltage and the constant output power while securing the high efficiency and power density.

In a first aspect, embodiments of the present disclosure provide an apparatus for DC-to-DC conversion. The apparatus comprises: a first transformer comprising a first winding at a primary side and a second winding at a secondary side; a second transformer comprising a third winding at a primary side and a fourth winding at a secondary side; and a controller configured to: control a first current in the first winding of the first transformer and a second current in the third winding of the second transformer to flow in a first pattern, such that the second winding of the first transformer and the fourth winding of the second transformer are electrically coupled in serial to output a first voltage, and control the first current and the second current to flow in a second pattern different from the first pattern, such that the second winding of the first transformer and the fourth winding of the second transformer are electrically coupled in parallel to output a second voltage lower than the first voltage.

Compared with the conventional solutions, the apparatus according to embodiments of the present disclosure allows the apparatus to have the wide range of the output voltage as well as the constant out power without an additional power stage, and thus the efficiency and the power density of the apparatus may be improved.

In some embodiments, the controller is configured to control the first current and the second current to flow in a same direction in the first pattern, and control the first current and the second current to flow in different directions in the second pattern.

In some embodiments, the second winding of the first transformer comprises a first terminal and a second terminal, the fourth winding of the second transformer comprises a third terminal and a fourth terminal, and the second terminal of the second winding is electrically coupled to the third terminal of the fourth winding, wherein the first terminal is a dotted terminal of the second winding and the third terminal is a dotted terminal of the fourth winding, or wherein the second terminal is a dotted terminal of the second winding and the fourth terminal is a dotted terminal of the fourth winding.

In other embodiments, the controller is configured to control the first current and the second current flow in different directions in the first pattern, and control the first current and the second current to flow in a same direction in the second pattern.

In some embodiments, the second winding of the first transformer comprises a first terminal and a second terminal, the fourth winding of the second transformer comprises a third terminal and a fourth terminal, and the second terminal of the second winding is electrically coupled to the third terminal of the fourth winding, wherein the first terminal is a dotted terminal of the second winding and the fourth terminal is a dotted terminal of the fourth winding, or wherein the second terminal is a dotted terminal of the second winding and the third terminal is a dotted terminal of the fourth winding.

In some embodiments, the apparatus further comprises: a first switching circuit electrically coupled between the first transformer and the controller; and a second switching circuit electrically coupled between the second transformer and the controller, wherein the controller is configured to control the first current by supplying a first control signal to the first switching circuit, and control the second current by supplying a second control signal to the second switching circuit.

In some embodiments, the apparatus further comprises: an output terminal; a reference potential terminal; a first rectifying element and a second rectifying element electrically coupled at a first node in series with each other between the output terminal and the reference potential terminal; a third rectifying element and a fourth rectifying element electrically coupled at a second node in series with each other between the output terminal and the reference potential terminal; and a fifth rectifying element and a sixth rectifying element electrically coupled at a third node in series with each other between the output terminal and the reference potential terminal, wherein the second winding of the first transformer comprises a first terminal coupled to the first node and a second terminal coupled to the third node, and wherein the fourth winding of the second transformer comprises a third terminal coupled to the third node and a fourth terminal coupled to the second node.

In some embodiments, the apparatus further comprises: an input terminal; a first transistor and a second transistor electrically coupled at a first intermediate node in series with each other between the input terminal and the reference potential terminal; and a third transistor and a fourth transistor electrically coupled at a second intermediate node in series with each other between the input terminal and the reference potential terminal, wherein the first winding of the first transformer is electrically coupled to the first intermediate node, and the third winding of the second transformer is electrically coupled to the second intermediate node.

In some embodiments, the apparatus further comprises: a first capacitor and a second capacitor electrically coupled at a third intermediate node in series with each other between the input terminal and the reference potential terminal; and a third capacitor and a fourth capacitor electrically coupled at a fourth intermediate node in series with each other between the input terminal and the reference potential terminal, wherein the first winding of the first transformer is further electrically coupled to the third intermediate node, and the third winding of the second transformer is further electrically coupled to the fourth intermediate node.

In other embodiments, the apparatus further comprises: an input terminal; an intermediate reference terminal; a first transistor and a second transistor electrically coupled at a first intermediate node in series with each other between the input terminal and the intermediate reference terminal; and a third transistor and a fourth transistor electrically coupled at a second intermediate node in series with each other between the intermediate reference terminal and the reference potential terminal, wherein the first winding of the first transformer is electrically coupled to the first intermediate node, and the third winding of the second transformer is electrically coupled to the second intermediate node.

In other embodiments, the apparatus further comprises: a first capacitor and a second capacitor electrically coupled at a third intermediate node in series with each other between the input terminal and the intermediate reference terminal; and a third capacitor and a fourth capacitor electrically coupled at a fourth intermediate node in series with each other between the intermediate reference terminal and the reference potential terminal, wherein the first winding of the first transformer is further electrically coupled to the third intermediate node, and the third winding of the second transformer is further electrically coupled to the fourth intermediate node.

In some embodiments, the apparatus further comprises: a first diode electrically coupled in parallel with the first capacitor; a second diode electrically coupled in parallel with the second capacitor; a third diode electrically coupled in parallel with the third capacitor; and a fourth diode electrically coupled in parallel with the fourth capacitor.

In some embodiments, the first winding of the first transformer comprises a first sub winding and a second sub winding, and the third winding of the second transformer comprises a third sub winding and a fourth sub winding. The apparatus further comprises: an input terminal; a reference potential terminal; a first transistor electrically coupled between the reference potential terminal and the first sub winding, the first sub winding comprising a dotted terminal electrically coupled to the input terminal and an opposite terminal electrically coupled to the first transistor; a second transistor electrically coupled between the reference potential terminal and the second sub winding, the second sub winding comprising a dotted terminal electrically coupled to the second transistor and an opposite terminal electrically coupled to the input terminal; a third transistor electrically coupled between the reference potential terminal and the third sub winding, the third sub winding comprising a dotted terminal electrically coupled to the input terminal and an opposite terminal electrically coupled to the third transistor; and a fourth transistor electrically coupled between the reference potential terminal and the fourth sub winding, the fourth sub winding comprising a dotted terminal electrically coupled to the fourth transistor and an opposite terminal electrically coupled to the input terminal.

In other embodiments, the first winding of the first transformer comprises a first sub winding and a second sub winding, and the third winding of the second transformer comprises a third sub winding and a fourth sub winding. The apparatus further comprises: an input terminal; an intermediate reference terminal; a reference potential terminal; a first transistor electrically coupled between the intermediate reference terminal and the first sub winding, the first sub winding comprising a dotted terminal electrically coupled to the input terminal and an opposite terminal electrically coupled to the first transistor; a second transistor electrically coupled between the intermediate reference terminal and the second sub winding, the second sub winding comprising a dotted terminal electrically coupled to the second transistor and an opposite terminal electrically coupled to the input terminal; a third transistor electrically coupled between the reference potential terminal and the third sub winding, the third sub winding comprising a dotted terminal electrically coupled to the intermediate reference terminal and an opposite terminal electrically coupled to the third transistor; and a fourth transistor electrically coupled between the reference potential terminal and the fourth sub winding, the fourth sub winding comprising a dotted terminal electrically coupled to the fourth transistor and an opposite terminal electrically coupled to the intermediate reference terminal.

In some embodiments, the controller is further configured to: control the first current and the second current to flow in a first direction by turning on the first transistor and the third transistor and turning off the second transistor and the fourth transistor; control the first current and the second current to flow in a second direction opposite to the first direction by turning off the first transistor and the third transistor and turning on the second transistor and the fourth transistor; control the first current to flow in the first direction and the second current to flow in the second direction by turning on the first transistor and the fourth transistor and turning off the second transistor and the third transistor; or control the first current to flow in the second direction and the second current to flow in the first direction by turning off the first transistor and the fourth transistor and turning on the second transistor and the third transistor.

In some embodiments, the apparatus further comprises: a fifth transistor and a sixth transistor electrically coupled at a third intermediate node in series with each other between the input terminal and the reference potential terminal; and a seventh transistor and an eighth transistor electrically coupled at a fourth intermediate node in series with each other between the input terminal and the reference potential terminal, wherein the first winding of the first transformer is further electrically coupled to the third intermediate node, and the third winding of the second transformer is further electrically coupled to the fourth intermediate node.

In other embodiments, the apparatus further comprises: a fifth transistor and a sixth transistor electrically coupled at a third intermediate node in series with each other between the input terminal and the intermediate reference terminal; and a seventh transistor and an eighth transistor electrically coupled at a fourth intermediate node in series with each other between the intermediate reference terminal and the reference potential terminal, wherein the first winding of the first transformer is further electrically coupled to the third intermediate node, and the third winding of the second transformer is further electrically coupled to the fourth intermediate node.

In some embodiments, the controller is further configured to: control the first current and the second current to flow in a first direction by turning on the first transistor, the third transistor, the sixth transistor and the eighth transistor and turning off the second transistor, the fourth transistor, the fifth transistor and the seventh transistor; control the first current and the second current to flow in a second direction opposite to the first direction by turning off the first transistor, the third transistor, the sixth transistor and the eighth transistor and turning on the second transistor, the fourth transistor, the fifth transistor and the seventh transistor; control the first current to flow in the first direction and the second current to flow in the second direction by turning on the first transistor, the fourth transistor, the sixth transistor and the seventh transistor and turning off the second transistor, the third transistor, the fifth transistor and the eighth transistor; or control the first current to flow in the second direction and the second current to flow in the first direction by turning off the first transistor, the fourth transistor, the sixth transistor and the seventh transistor and turning on the second transistor, the third transistor, the fifth transistor and the eighth transistor.

In some embodiments, the first winding of the first transformer comprises a dotted terminal electrically coupled to the first intermediate node and an opposite terminal electrically coupled to the third intermediate node, and the third winding of the second transformer comprises a dotted terminal electrically coupled to the second intermediate node and an opposite terminal electrically coupled to the fourth intermediate node.

In other embodiments, the first winding of the first transformer comprises a dotted terminal electrically coupled to the third intermediate node and an opposite terminal electrically coupled to the first intermediate node, and the third winding of the second transformer comprises a dotted terminal electrically coupled to the fourth intermediate node and an opposite terminal electrically coupled to the second intermediate node.

In some embodiments, the apparatus further comprises: an input terminal; a reference potential terminal; a first DC-to-DC converter circuit electrically coupled in series with each other between the input terminal and the reference potential terminal, and electrically coupled to the first winding of the first transformer; and a second DC-to-DC converter circuit electrically coupled in series with each other between the input terminal and the reference potential terminal, and electrically coupled to the third winding of the second transformer.

In other embodiments, the apparatus further comprises: an input terminal; an intermediate reference terminal; a reference potential terminal; a first DC-to-DC converter circuit electrically coupled in series between the input terminal and the intermediate reference terminal, and electrically coupled to the first winding of the first transformer; and a second DC-to-DC converter circuit electrically coupled in series between the intermediate reference terminal and the reference potential terminal, and electrically coupled to the third winding of the second transformer.

In some embodiments, the apparatus further comprises: a filter comprising an output capacitor electrically coupled between the output terminal and the reference potential terminal.

In some embodiments, the apparatus further comprises: a first inductor electrically coupled between the first intermediate node and the first winding; and a second inductor electrically coupled between the second intermediate node and the third winding.

In some embodiments, the apparatus further comprises: a first inductor electrically coupled between the third intermediate node and the first winding; and a second inductor electrically coupled between the fourth intermediate node and the third winding.

In other embodiments, the apparatus further comprises: a filter comprising: an output capacitor electrically coupled between the output terminal and the reference potential terminal; and an inductor electrically coupled between the output terminal and a common node of cathodes of the first rectifying element, the third rectifying element and the fifth rectifying element.

In other embodiments, the apparatus further comprises: a filter comprising: an output capacitor electrically coupled between the output terminal and the reference potential terminal; and an inductor electrically coupled between the output terminal and a common node of anodes of the second rectifying element, the fourth rectifying element and the sixth rectifying element.

In a second aspect, embodiments of the present disclosure provide a method for DC-to-DC conversion. The method comprises: controlling a first current in a primary winding of a first transformer and a second current in a primary winding of a second transformer to flow in a first pattern, such that a secondary winding of the first transformer and a secondary winding of the second transformer are electrically coupled in serial to output a first voltage; and controlling the first current and the second current to flow in a second pattern different from the first pattern, such that the secondary winding of the first transformer and the secondary winding of the second transformer are electrically coupled in parallel to output a second voltage lower than the first voltage.

In some embodiments, controlling the first current and the second current to flow in the first pattern comprises controlling the first current and the second current to flow in a same direction, and controlling the first current and the second current to flow in the second pattern comprises controlling the first current and the second current to flow in different directions.

In other embodiments, controlling the first current and the second current to flow in the first pattern comprises controlling the first current and the second current to flow in different directions, and controlling the first current and the second current to flow in the second pattern comprises controlling the first current and the second current to flow in a same direction.

In some embodiments, controlling the first current comprises supplying a first control signal to a first switching circuit electrically coupled to the primary winding of the first transformer, and controlling the second current comprises supplying a second control signal to a second switching circuit electrically coupled to the primary winding of the second transformer.

In some embodiments, the method further comprises: controlling the first current and the second current to flow in a first direction by turning on a first high-side transistor electrically coupled to the primary winding of the first transformer and a second high-side transistor electrically coupled to the primary winding of the second transformer, and turning off a first low-side transistor electrically coupled to the primary winding of the first transformer and a second low-side transistor electrically coupled to the primary winding of the second transformer; controlling the first current and the second current to flow in a second direction opposite to the first direction by turning off the first high-side transistor and the second high-side transistor and turning on the first low-side transistor and the second low-side transistor; controlling the first current to flow in the first direction and the second current to flow in the second direction by turning on the first high-side transistor and the second low-side transistor and turning off the first low-side transistor and the second high-side transistor; or controlling the first current to flow in the second direction and the second current to flow in the first direction by turning off the first high-side transistor and the second low-side transistor and turning on the first low-side transistor and the second high-side transistor.

In a third aspect, embodiments of the present disclosure provide a computer-readable medium. The computer-readable medium has computer-readable instructions stored thereon, the computer-readable instructions, when executed, causing a device to perform the method as described above.

According to embodiments of the present disclosure, the flow directions of the output currents in the secondary windings of the transformers are controlled by controlling the flow directions of the currents in the primary windings of the transformers. When the output currents in the secondary windings of the transformers are controlled such that the secondary windings of the transformers are electrically coupled in series with each other, the high voltage is output from the secondary windings. Moreover, when the output currents in the secondary windings of the transformers are controlled such that the secondary windings of the transformers are electrically coupled in parallel with each other, the low voltage is output from the secondary windings. In this way, the wide range of the output voltage and the constant output power may be achieved without an additional power stage, and the design of the individual transformer may be optimized. Therefore, the efficiency and the power density are improved with fewer components.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. For a more complete understanding of the present invention, and the advantages thereof, reference is now made to the following descriptions taken in conjunction with the accompanying drawings, in which.

DETAILED DESCRIPTION

Figure 1:
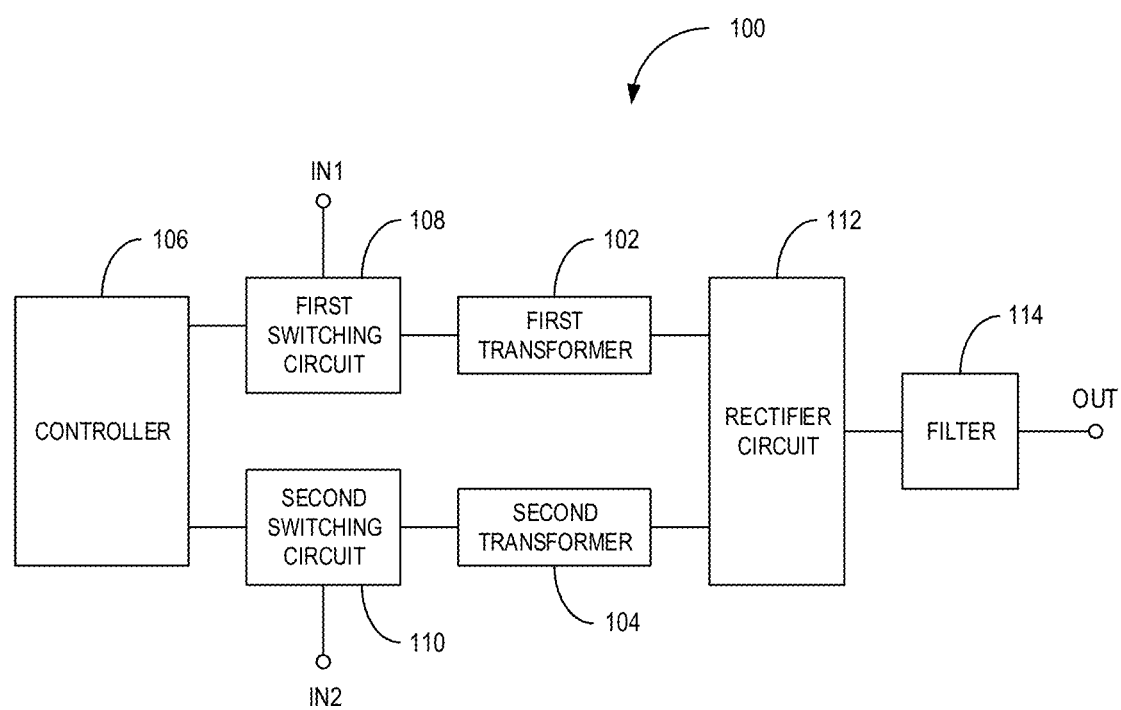
FIG. 1 illustrates a block diagram of an apparatus for DC-to-DC conversion according to an embodiment of the present disclosure.

The subject matter described herein will now be discussed with reference to several example embodiments. These embodiments are discussed only for the purpose of enabling those skilled persons in the art to better understand and thus implement the subject matter described herein, rather than suggesting any limitations on the scope of the subject matter.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "one embodiment" and "an embodiment" are to be read as "at least one embodiment." The term "another embodiment" is to be read as "at least one other embodiment." Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the Figures. Other explicit and implicit definitions may be included below.

In a conventional solution, a DC-to-DC converter is configured to comprise an additional power stage electrically coupled to a secondary side, in order to implement a wide range of an output voltage and a constant output power. However, in the solution, since the additional power stage is provided, efficiency for the DC-to-DC converter is degraded and thus a power density is reduced.

In view of the above, embodiments of the present disclosure provide an improved solution for DC-to-DC conversion, which provides a novel circuit topology and a corresponding control scheme to achieve the wide range of the output voltage and the constant output power without providing an additional power stage.

According to the embodiments, at least two transformers are provided, and a controller is configured to controls currents flowing in primary windings of the transformers. When the currents in the primary windings of the transformers are controlled to flow in a first current-flow pattern, secondary windings of the transformers are electrically coupled in serial with each other to output a high voltage. When the currents in the primary windings of the transformers are controlled to flow in a second current-flow pattern, the secondary windings of the transformers are electrically coupled in parallel with each other to output a low voltage. In this way, the wide range of the output voltage and the constant output power are achieved while securing the high power density with fewer components.

Hereinafter, the embodiments of the present disclosure will be described in detail with reference to the accompanying drawings.

FIG. 1 illustrates a block diagram of an apparatus 100 for DC-to-DC conversion according to an embodiment of the present disclosure. Referring to FIG. 1, the apparatus 100 comprises a first transformer 102, a second transformer 104, and a controller 106.

The controller 106 is configured to control a first current flowing in a primary winding of the first transformer 102 and a second current flowing in a primary winding of the second transformer 104. The controller 106 controls flow directions of the first and second currents. The controller 106 controls the first current and the second current to flow in a same direction or in different directions. Herein, the same direction means that both the first current and the second current flow from or into dotted terminals. In addition, the different directions means that the first current flows from the dotted terminal while the second current flows into the dotted terminal, or means that the first current flows into the dotted terminal while the second current flows from the dotted terminal.

Moreover, the controller 106 is configured to control the first current and the second current to flow in a first pattern, such that a secondary winding of the first transformer 102 and a secondary winding of the second transformer 104 are electrically coupled in serial with each other to output a first voltage. The controller 106 is further configured to control the first current and the second current to flow in a second pattern different from the first pattern, such that the secondary winding of the first transformer 102 and the secondary winding of the second transformer 104 are electrically coupled in parallel with each other to output a second voltage lower than the first voltage. In some embodiments, the first current and the second current flow in the same direction in the first pattern, and the first current and the second current flow in the different directions in the second pattern. Alternatively, the first current and the second current flow in the different directions in the first pattern, and the first current and the second current flow in the same direction in the second pattern.

In some embodiments, the apparatus 100 outputs the high voltage in the first pattern for the current flow directions and outputs the low voltage in the second pattern for the current flow directions. In this way, the apparatus 100 may achieve the wide range of the output voltage without the additional power stage. Moreover, the secondary winding of the first transformer 102 and the secondary winding of the second transformer 104 are electrically coupled in serial to output a relatively low current and a relatively high voltage, and in parallel to output a relatively high current and a relatively low voltage. In this way, the apparatus 100 may achieve the constant output power with fewer components.

Referring to FIG. 1, in some embodiments, the apparatus 100 may further comprise a first switching circuit 108 and a second switching circuit 110. The first switching circuit 108 may be electrically coupled to a first supply IN1, and the second switching circuit 110 may be electrically coupled to a second supply IN2. In some embodiments, each of the first supply IN1 and the second supply IN2 may be a DC supply.

In some embodiments, the first switching circuit 108 may be electrically coupled between the first transformer 102 and the controller 106, and the second switching circuit 110 may be electrically coupled between the second transformer 104 and the controller 106. In some embodiments, the controller 106 may control the first current flowing in the primary winding of the first transformer 102 by supplying a first control signal to the first switching circuit 108, and control the second current flowing in the primary winding of the second transformer 104 by supplying a second control signal to the second switching circuit 110. In some embodiments, the first control signal comprises a first set of drive signals for corresponding switching elements of the first switching circuit 108, and the second control signal comprises a second set of drive signals for corresponding switching elements of the second switching circuit 110.

Referring to FIG. 1, in some embodiments, the apparatus 100 may further comprise a rectifier circuit 112 and a filter 114. The rectifier circuit 112 may be electrically coupled to the secondary windings of the first transformer 102 and the second transformer 104, and the filter 114 is electrically coupled between the rectifier circuit 112 and an output terminal OUT. The apparatus 110 may output a desired DC supply at the output terminal OUT through the rectifier circuit 112 and the filter 114.

In some embodiments, when the first and second currents of the primary windings flow in the first pattern, the rectifier circuit 112 allows output currents of the secondary windings to flow in a manner such that the secondary windings of the first transformer 102 and the second transformer 104 are electrically coupled in serial to output the high voltage. In some embodiments, when the first and second currents of the primary windings flow in the second pattern, the rectifier circuit 112 allows the output currents of the secondary windings to flow in a manner such that the secondary windings of the first transformer 102 and the second transformer 104 are electrically coupled in parallel to output the low voltage.

Hereinafter, several circuit implementations of the apparatus 100 according to the embodiments of the present disclosure will be described in detail.

Figure 2:
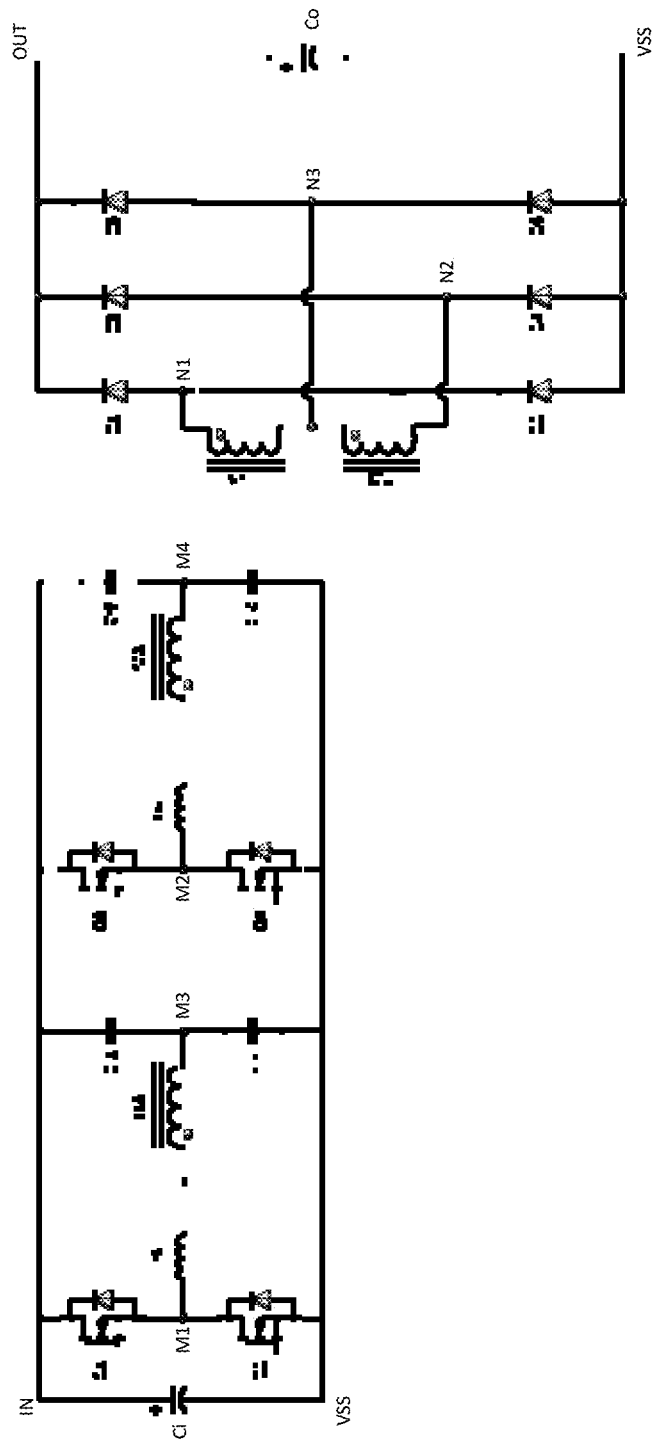
FIG. 2 illustrates a diagram of circuit implementation of an apparatus for DC-to-DC conversion according to an embodiment of the present disclosure.

FIG. 2 illustrates a diagram of circuit implementation of the apparatus 100 according to embodiments of the present disclosure. Referring to FIG. 2, the first transformer 102 comprises a first winding T1A at the primary side and a second winding T1B at a secondary side, and the second transformer 104 comprises a third winding T2A at the primary side and a fourth winding T2B at the secondary side. Moreover, the apparatus 100 comprises an input terminal IN, a reference potential terminal VSS, and an output terminal OUT. It should be noted that, the controller is not illustrated in FIG. 2, but the controller supplies drive signals to control terminals of transistors Q1 to Q4.

In some embodiments, the apparatus 100 may comprise a first LLC topology circuit and a second LLC topology circuit. The first LLC topology circuit comprises the first winding T1A of the first transformer 102, a first inductor Lr1, and first and second capacitors Cr1 and Cr2. In addition, the second LLC topology circuit comprises the third winding T2A of the second transformer 104, a second inductor Lr2, and third and fourth capacitors Cr3 and Cr4. In some embodiments, the first inductor Lr1 is electrically coupled in serial with the first winding T1A, and the second inductor Lr2 is electrically coupled in serial with the third winding T2A.

In some embodiments, the apparatus 100 may further comprise a first half-bridge circuit and a second half-bridge circuit as the switching circuits. The first half-bridge circuit comprises a first transistor Q1 and a second transistor Q2 electrically coupled in series with each other between the input terminal IN and the reference potential terminal VSS. The first and second transistors Q1 and Q2 are electrically coupled with each other at a first intermediate node M1. In addition, the second half-bridge circuit comprises a third transistor Q3 and a fourth transistor Q4 electrically coupled in series with each other between the input terminal IN and the reference potential terminal VSS. The third and fourth transistors Q3 and Q4 are electrically coupled with each other at a second intermediate node M2.

In some embodiments, the first winding T1A of the first transformer 102 is electrically coupled to the first intermediate node M1 via the first inductor Lr1, and the third winding T2A of the second transformer 104 is electrically coupled to the second intermediate node M2 via the second inductor Lr2. In some embodiments, the first winding T1A is electrically coupled to the input terminal IN via the first transistor Q1 and to the reference potential terminal VSS via the second transistor Q2. In some embodiments, the third winding T2A is electrically coupled to the input terminal IN via the third transistor Q3 and to the reference potential terminal VSS via the fourth transistor Q4.

In some embodiments, the first and second capacitors Cr1 and Cr2 are electrically coupled in series with each other between the input terminal IN and the reference potential terminal VSS. The first and second capacitors Cr1 and Cr2 are electrically coupled with each other at a third intermediate node M3. In addition, the third and fourth capacitors Cr3 and Cr4 are electrically coupled in series with each other between the input terminal IN and the reference potential terminal VSS. The third and fourth capacitors Cr3 and Cr4 are electrically coupled with each other at a fourth intermediate node M4. In some embodiments, the first winding T1A of the first transformer 102 is further electrically coupled to the third intermediate node M3, and the third winding T2A of the second transformer 104 is further electrically coupled to the fourth intermediate node M4.

In some embodiments, the first inductor Lr1 is electrically coupled between the first intermediate node M1 and the first winding T1A, and the second inductor Lr2 is electrically coupled between the second intermediate node M2 and the third winding T2A. It should be noted that FIG. 2 is merely an example implementation without suggesting any limitations as to the scope of the present disclosure. For example, in alternative embodiments, the first inductor Lr1 is electrically coupled between the third intermediate node M3 and the first winding T1A, and the second inductor Lr2 is electrically coupled between the fourth intermediate node M4 and the third winding T2A. Moreover, a first current transformer may be electrically coupled to the first winding T1A, and a second current transformer may be electrically coupled to the third winding T2A.

Referring to FIG. 2, in some embodiments, the apparatus 100 may comprise first to sixth rectifying elements D1 to D6 that constitute the rectifier circuit. The first and second rectifying elements D1 and D2 are electrically coupled in series with each other between the output terminal OUT and the reference potential terminal VSS, and electrically coupled with each other at a first node N1. The third and fourth rectifying elements D3 and D4 are electrically coupled in series with each other between the output terminal OUT and the reference potential terminal VSS, and electrically coupled with each other at a second node N2. The fifth and sixth rectifying elements D5 and D6 are electrically coupled in series with each other between the output terminal OUT and the reference potential terminal VSS, and electrically coupled with each other at a third node N3.

In some embodiments, each of the rectifying elements D1 to D6 is a diode. Cathodes of the first, third and fifth rectifying elements D1, D3 and D5 are electrically coupled to the output terminal OUT, and anodes of the first, third and fifth rectifying elements D1, D3 and D5 are electrically coupled to the first node N1, the second node N2 and the third node N3, respectively. In addition, anodes of the second, fourth and sixth rectifying elements D2, D4 and D6 are electrically coupled to the reference potential terminal VSS, and cathodes of the second, fourth and sixth rectifying elements D2, D4 and D6 are electrically coupled to the first node N1, the second node N2 and the third node N3, respectively.

It is to be noted that the rectifying elements D1 to D6 can be implemented by other suitable devices than diodes. For example, in alternative embodiments, one or more of the rectifying elements D1 to D6 can be implemented by MOS transistors, silicon carbide transistors, IGBTs, and etc.

In some embodiments, the second winding T1B of the first transformer 102 comprises a first terminal coupled to the first node N1 and a second terminal coupled to the third node N3. In addition, the fourth winding T2B of the second transformer 104 comprises a third terminal coupled to the third node N3 and a fourth terminal coupled to the second node N2. In some embodiments, the first terminal is a dotted terminal of the second winding T1B and the third terminal is a dotted terminal of the fourth winding T2B, or the second terminal is a dotted terminal of the second winding T1B and the fourth terminal is a dotted terminal of the fourth winding T2B. In other embodiments, the first terminal is a dotted terminal of the second winding T1B and the fourth terminal is a dotted terminal of the fourth winding T2B, or the second terminal is a dotted terminal of the second winding T1B and the third terminal is a dotted terminal of the fourth winding T2B.

In the embodiment as shown in FIG. 2, the dotted terminal of the second winding T1B and the dotted terminal of the fourth winding T2B are electrically coupled to the first node N1 and the third node N3, respectively. In other embodiments, the dotted terminal of the second winding T1B and the dotted terminal of the fourth winding T2B may be electrically coupled to the third node N3 and the second node N2, respectively. In both cases, when the output currents in the second and fourth windings T1B and T2B flow in the same direction, the second and fourth windings T1B and T2B are electrically coupled in series with each other. When the output currents in the second and fourth windings T1B and T2B flow in the different directions, the second and fourth windings T1B and T2B are electrically coupled in parallel with each other.

It is to be noted that although FIG. 2 illustrates that the dotted terminal of the second winding T1B is electrically coupled to the first node N1 and the dotted terminal of the fourth winding T2B is electrically coupled to the third node N3, the scope of the present disclosure are not limited thereto. In other embodiments, any of the terminals of the second winding T1B may be electrically coupled to the first node N1, and any of the terminals of the fourth winding T2B may be electrically coupled to the third node N3, for example.

In alternative embodiments, the doted terminal of the second winding T1B and the dotted terminal of the fourth winding T2B may be both electrically coupled to the third node N3, or may be electrically coupled to the first node N1 and the second node N2, respectively. In such cases, the second and fourth windings T1B and T2B are electrically coupled in series with each other when the output currents in the second and fourth windings T1B and T2B flow in the different directions, and in parallel with each other when the output currents in the second and fourth windings T1B and T2B flow in the same direction.

Moreover, although FIG. 2 illustrates that the dotted terminal of the first winding T1A is electrically coupled to the first inductor Lr1 and the dotted terminal of the third winding T2A is electrically coupled to the second inductor Lr2, it is merely an example implementation without suggesting any limitations as to the scope of the present disclosure. For example, in other embodiments, any of the terminals of the first winding T1A may be electrically coupled to the first inductor Lr1, and any of the terminals of the third winding T2A may be electrically coupled to the second inductor Lr2.

Still in reference to FIG. 2, in some embodiments, the apparatus 100 may further comprise an output capacitor Co as the filter. The output capacitor Co may be electrically coupled between the output terminal OUT and the reference potential terminal VSS. Moreover, in some embodiments, the apparatus 100 may further comprise an input capacitor Ci electrically coupled between the input terminal IN and the reference potential terminal.

Figure 3:
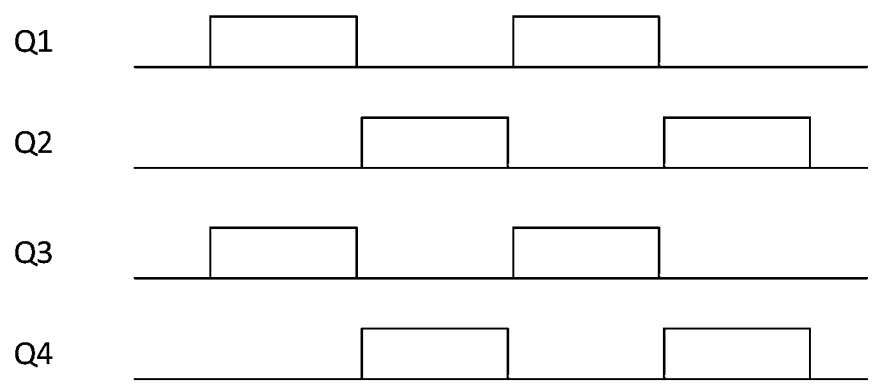
FIG. 3 illustrates drive signals for an apparatus for DC-to-DC conversion according to an embodiment of the present disclosure.

FIG. 3 illustrates drive signals for the transistors Q1 to Q4 of the apparatus 100 as shown in FIG. 2. As shown in FIG. 3, the first and third transistors Q1 and Q3 are driven by the controller in a same phase, and the second and fourth transistors Q2 and Q4 are driven by the controller in a same phase. Moreover, FIGS. 4A and 4B illustrate current flow patterns for the apparatus 100 as shown in FIG. 2.

Figure 4A:
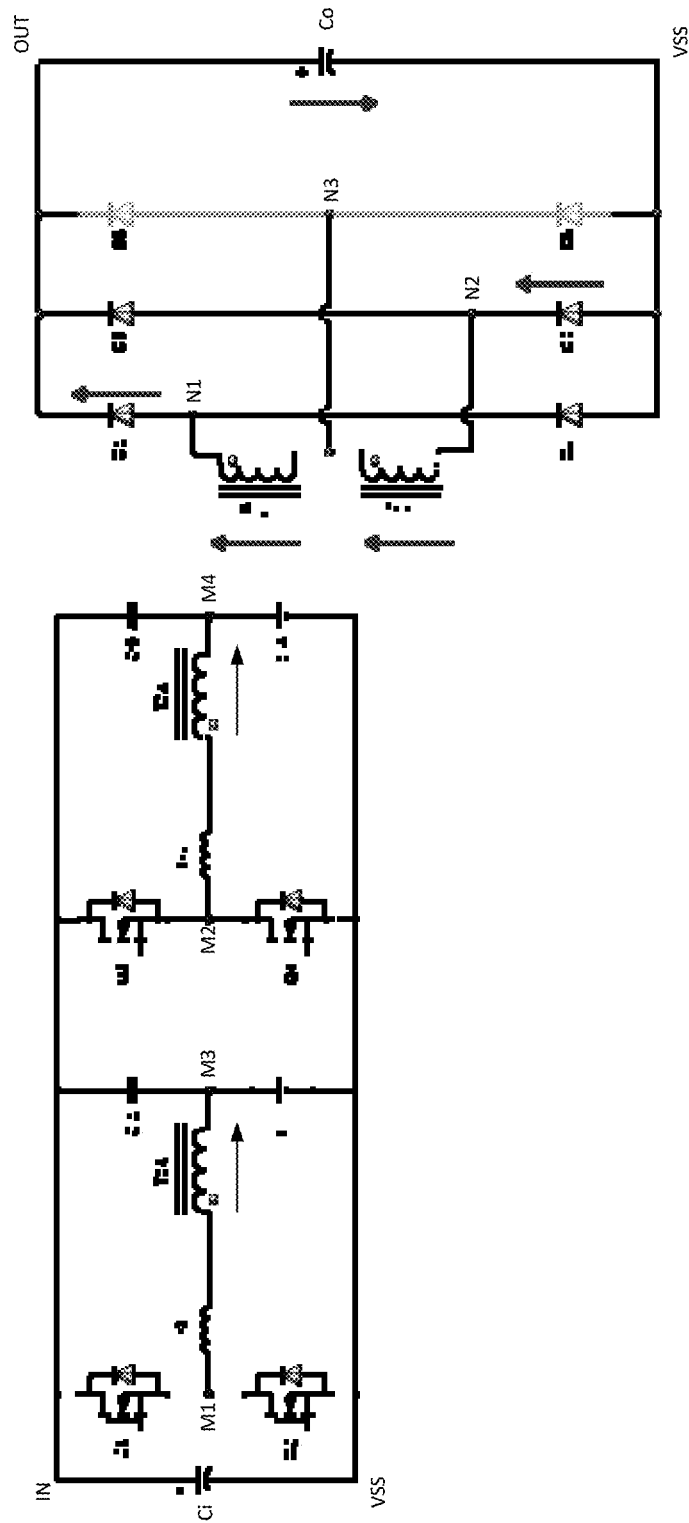
FIGS. 4A and 4B illustrate current flow patterns for an apparatus for DC-to-DC conversion according to embodiments of the present disclosure.

Referring to FIGS. 3 and 4A, if the first and third transistors Q1 and Q3 are turned on and the second and fourth transistors Q2 and Q4 are turned off by the controller with the respective drive signals, the first current in the first winding T1A and the second current in the third winding T2A are controlled to flow into the dotted terminals in a first direction at the primary sides. Accordingly, the output currents in the second and fourth windings T1B and T2B flow from the dotted terminals in the same direction at the secondary sides, and the second and fourth windings T1B and T2B are electrically connected in serial with each other to output the high voltage. In the current flow pattern illustrated in FIG. 4A, the output currents flow through the first and fourth rectifying elements D1 and D4.

Figure 4B:
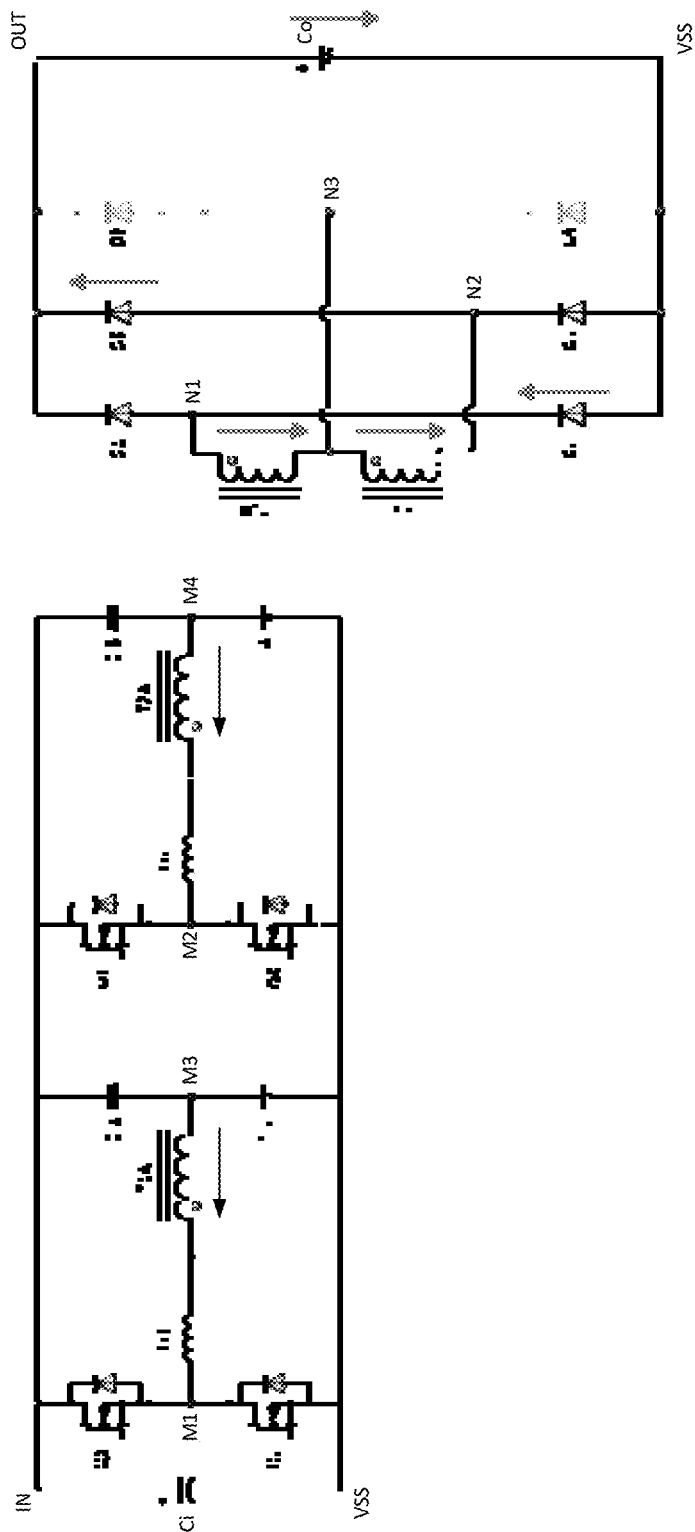

Moreover, as shown in FIGS. 3 and 4B, if the first and third transistors Q1 and Q3 are turned off and the second and fourth transistors Q2 and Q4 are turned on by the controller with the respective drive signals, the first current in the first winding T1A and the second current in the third winding T2A are controlled to flow from the dotted terminals in a second direction at the primary sides. Accordingly, the output currents in the second and fourth windings T1B and T2B flow into the dotted terminals in the same direction at the secondary sides, and the second and fourth windings T1B and T2B are electrically connected in serial with each other to output the high voltage. In the current flow pattern illustrated in FIG. 4B, the output currents flow through the second and third rectifying elements D2 and D3.

It is to be noted that although FIG. 3 shows that the first and third transistors Q1 and Q3 are turned on substantially at the same time by the drive signals, and the second and fourth transistors Q2 and Q4 are turned on substantially at the same time by the drive signals, it is merely an example implementation without suggesting any limitations as to the scope of the present disclosure. For example, in other embodiments, there may be a phase shift between the drive signal for the first transistor Q1 and the drive signal for the third transistor Q3, or between the drive signal for the second transistor Q2 and the drive signal for the fourth transistor Q4.

Figure 5:
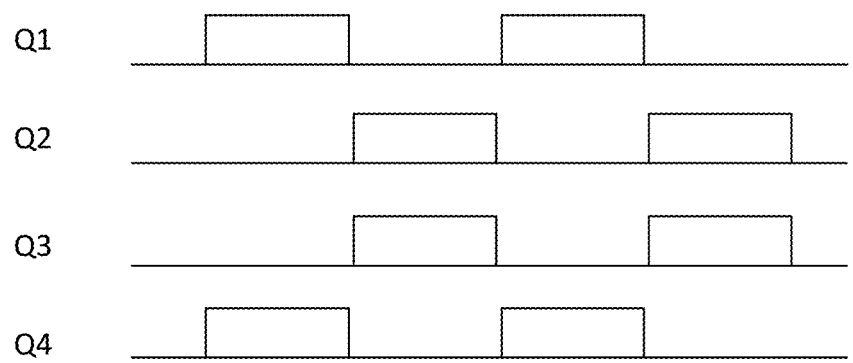
FIG. 5 illustrates drive signals for an apparatus for DC-to-DC conversion according to an embodiment of the present disclosure.
Figure 6A:
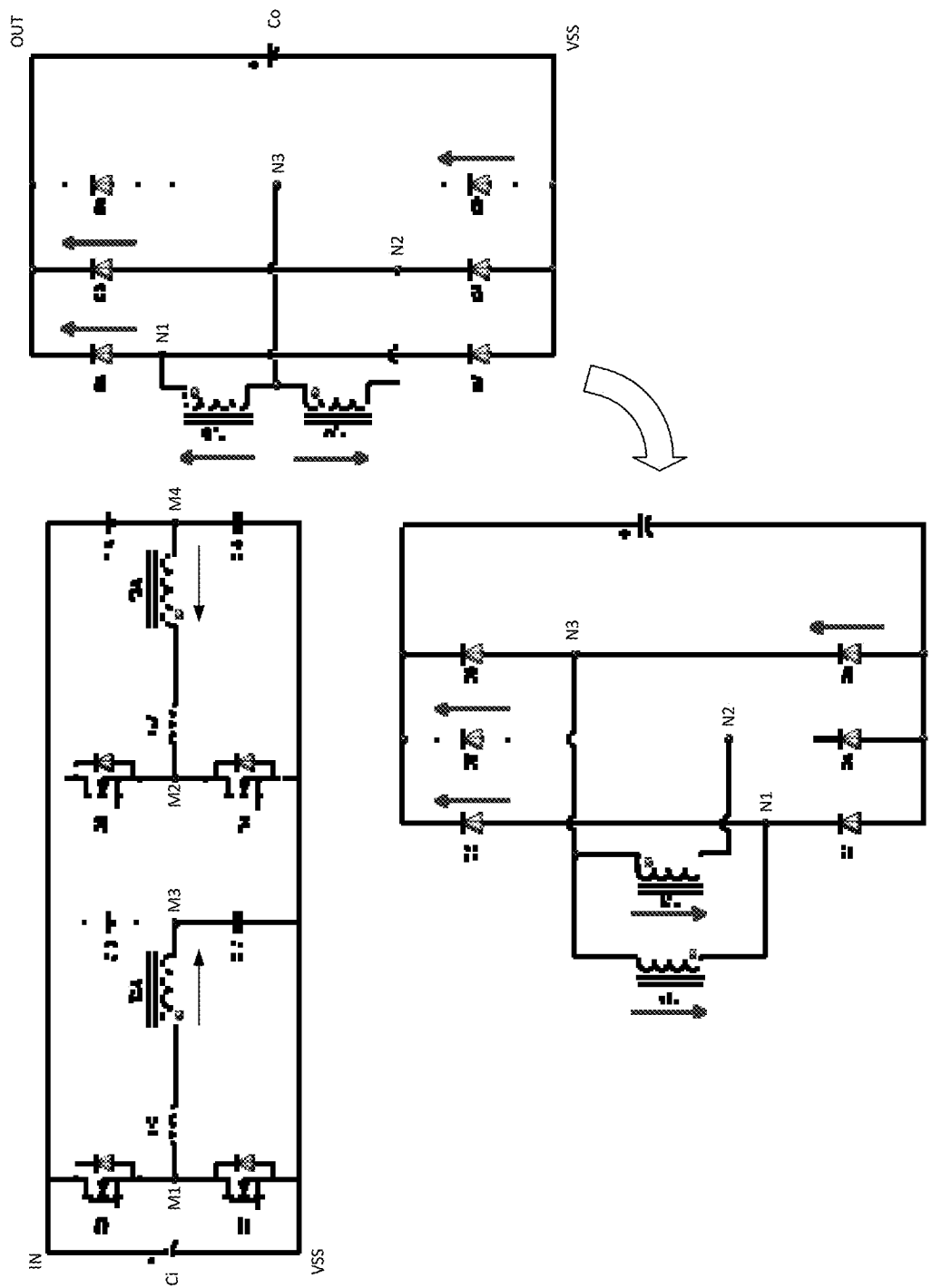
FIGS. 6A and 6B illustrate current flow patterns for an apparatus for DC-to-DC conversion according to embodiments of the present disclosure.
Figure 6B:
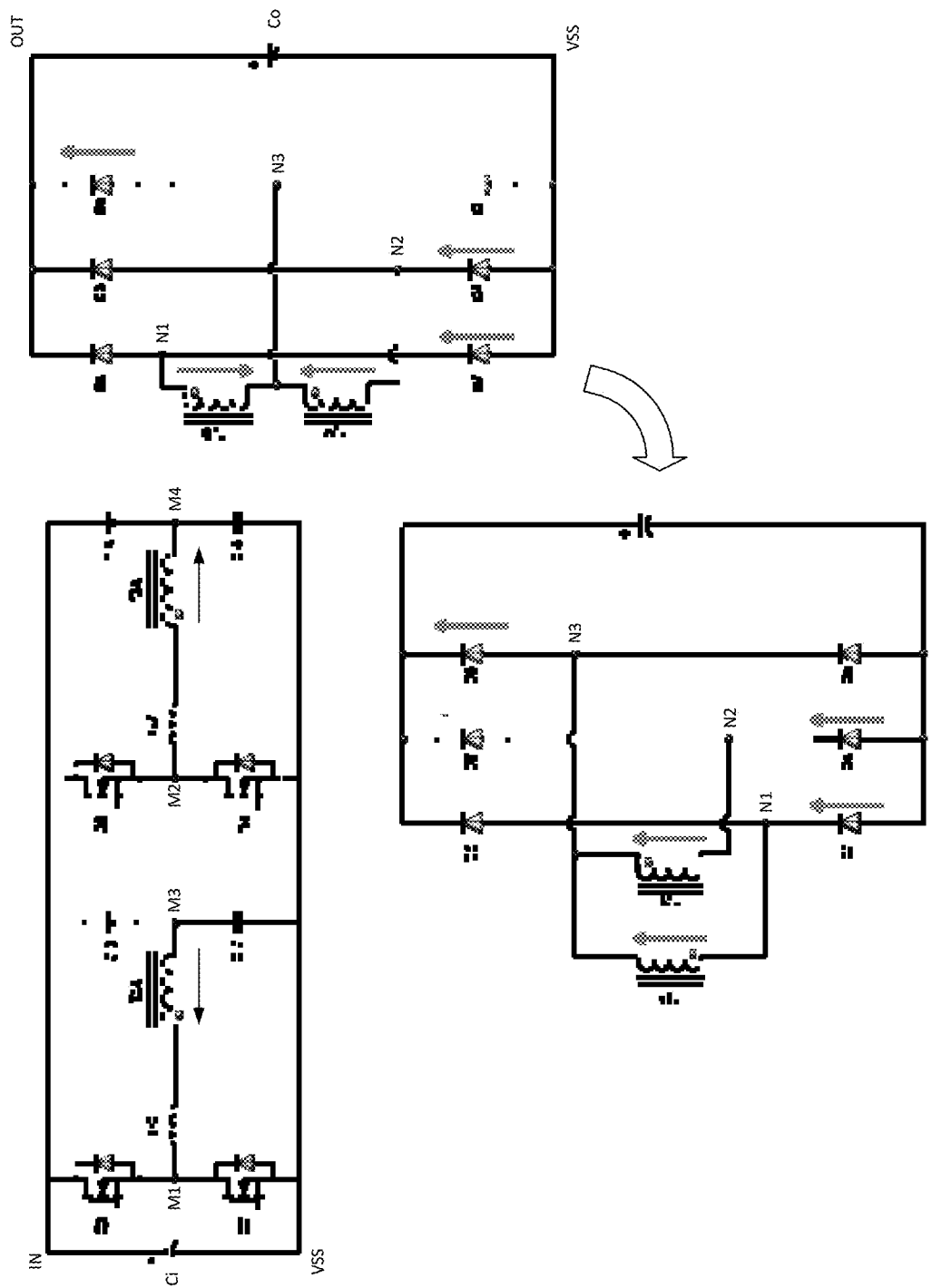

FIG. 5 illustrates drive signals for the transistors Q1 to Q4 of the apparatus 100 as shown in FIG. 2. As shown in FIG. 5, the first and fourth transistors Q1 and Q4 are driven by the controller in a same phase, and the second and third transistors Q2 and Q3 are driven by the controller in a same phase. FIGS. 6A and 6B illustrate current flow patterns for the apparatus 100 as shown in FIG. 2.

As shown in FIGS. 5 and 6A, if the first and fourth transistors Q1 and Q4 are turned on and the second and third transistors Q2 and Q3 are turned off by the controller with the respective drive signals, the first current in the first winding T1A is controlled to flow into the dotted terminal in the first direction and the second current in the third winding T2A is controlled to flow from the dotted terminal in the second direction at the primary sides. Accordingly, the output current in the second winding T1B flows from the dotted terminal and the output current in the fourth winding T2B flows into the dotted terminals at the secondary sides, and the second and fourth windings T1B and T2B are equivalent to be electrically connected in parallel with each other to output the low voltage. In the current flow pattern illustrated in FIG. 6A, the output current in the second winding T1B flows through the first and sixth rectifying elements D1 and D6, and the output current in the fourth winding T2B flows through the third and sixth rectifying elements D3 and D6.

Moreover, as shown in FIGS. 5 and 6B, if the first and fourth transistors Q1 and Q4 are turned off and the second and third transistors Q2 and Q3 are turned on by the controller with the respective drive signals, the first current in the first winding T1A is controlled to flow from the dotted terminal in the second direction and the second current in the third winding T2A is controlled to flow into the dotted terminal in the first direction at the primary sides. Accordingly, the output current in the second winding T1B flows into the dotted terminal and the output current in the fourth winding T2B flows from the dotted terminals at the secondary sides, and the second and fourth windings T1B and T2B are equivalent to be electrically connected in parallel with each other to output the low voltage. In the current pattern illustrated in FIG. 6B, the output current in the second winding T1B flows through the second and fifth rectifying elements D2 and D5, and the output current in the fourth winding T2B flows through the fourth and fifth rectifying elements D4 and D5.

It is to be understood that the control schemes as shown in FIGS. 4A, 4B, 6A and 6B are merely examples without suggesting any limitations as to the scope of the present disclosure. As described above, in some alternative embodiments, the doted terminal of the second winding T1B and the dotted terminal of the fourth winding T2B may be both electrically coupled to the third node N3, or may be electrically coupled to the first node N1 and the second node N2, respectively. In such embodiments, the current flow patterns are opposite to those as illustrated in FIGS. 4A, 4B, 6A and 6B under the control of the drive signals of FIGS. 3 and 5. More specifically, when the output currents in the second and fourth windings T1B and T2B flow in the different directions, the second and fourth windings T1B and T2B are electrically coupled in series with each other; and when the output currents in the second and fourth windings T1B and T2B flow in the same direction, the second and fourth windings T1B and T2B are electrically coupled in parallel with each other.

According to the embodiments of the present disclosure, the high voltage is output when the secondary windings of the transformers are electrically connected in series, and the low voltage is output when the secondary windings of the transformers are electrically connected in parallel. In this way, the wide range of the output voltage with the constant output power is achieved without additional power stage, and the designs for the transformers can be optimized to be best. Thus, the apparatus 100 has improved efficiency and is able to provide high power density with fewer components.

Hereinafter, several alternative circuit implementations for the apparatus 100 will be described. Generally speaking, in those alternative embodiments, circuit topologies at the primary sides of the transformers can be varied.

Figure 7A:
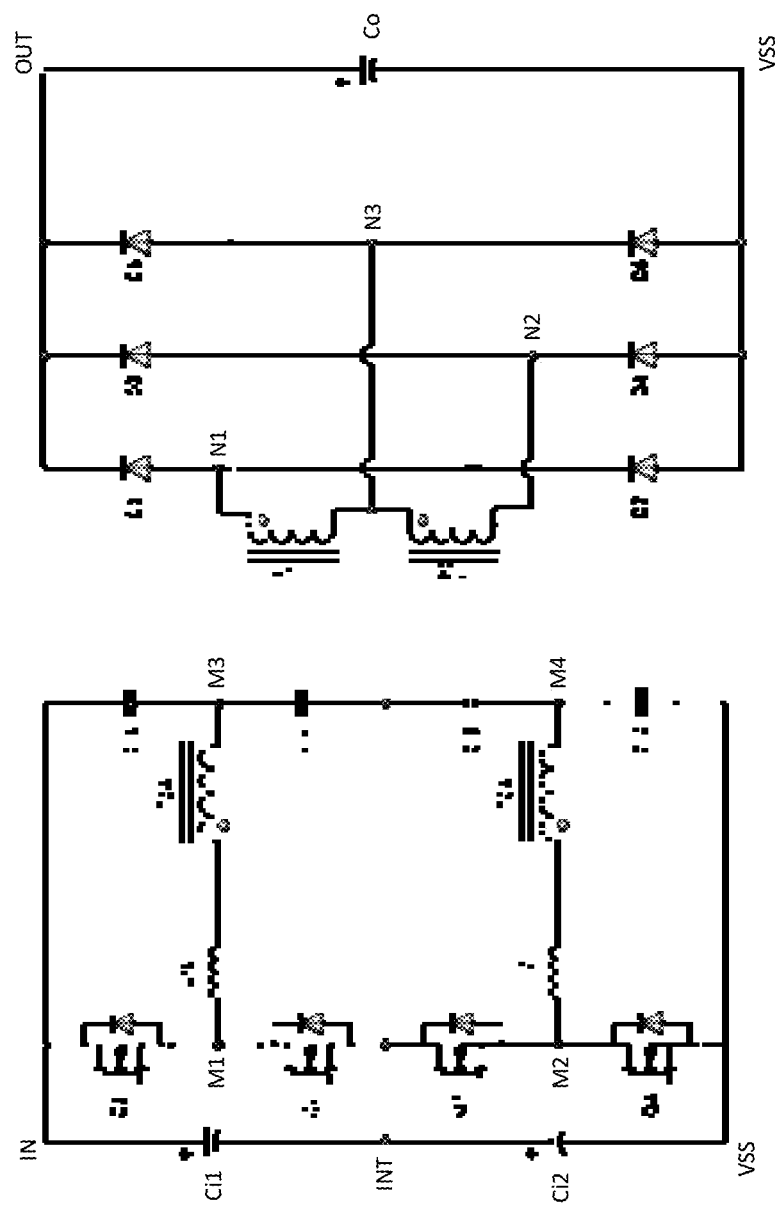
FIGS. 7A, 7B and 7C illustrate diagrams of other circuit implementations of an apparatus for DC-to-DC conversion according to embodiments of the present disclosure.
Figure 7B:
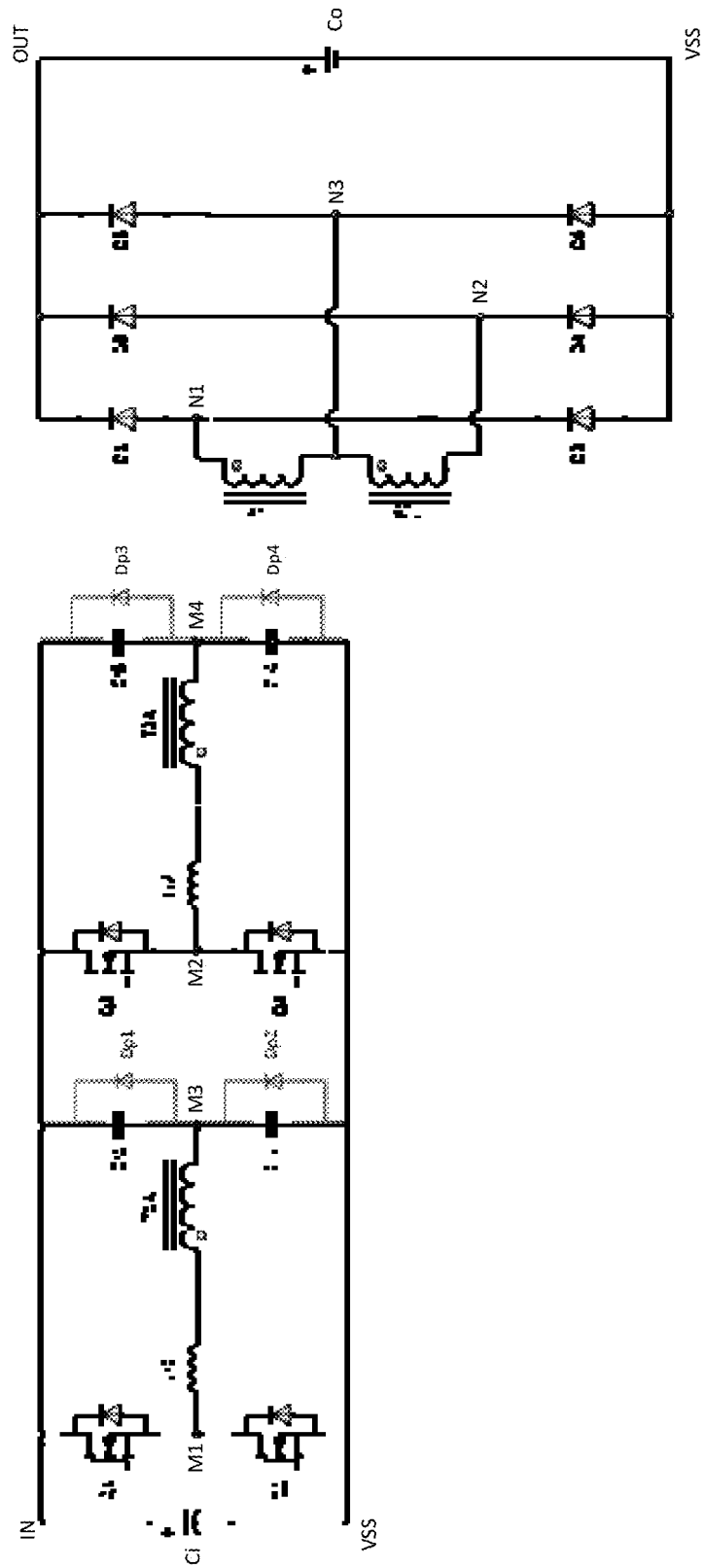
Figure 7C:
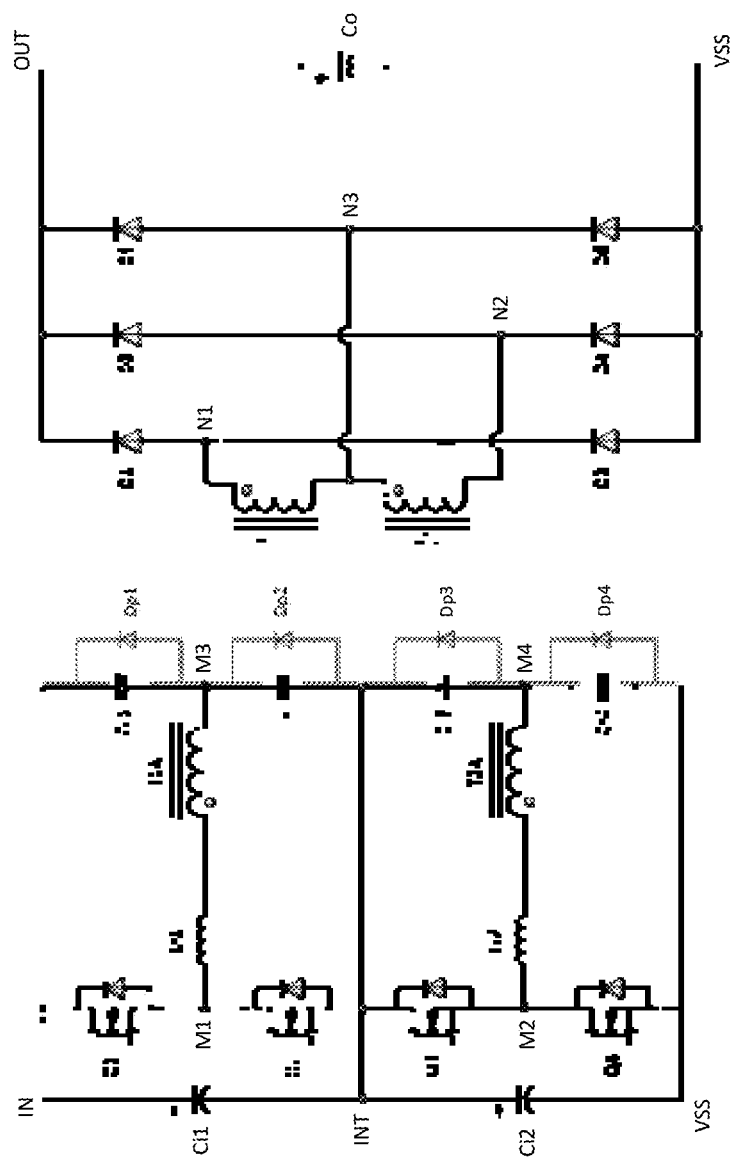

FIGS. 7A, 7B and 7C illustrate diagrams of other circuit implementations of the apparatus 100 according to embodiments of the present disclosure. The implementations as shown in FIGS. 7A, 7B and 7C are similar to that as discussed above with reference to FIG. 2 except for the primary sides of the transformers. In the following, descriptions on the similar circuit topology, control scheme and current flow pattern will be omitted.

In the embodiment shown in FIG. 7A, the apparatus 100 further comprises an intermediate reference terminal INT, a first input capacitor Ci1 electrically coupled between the input terminal IN and the intermediate reference terminal INT, and a second input capacitor Ci2 electrically coupled between the intermediate reference terminal INT and the reference potential terminal VSS.

In some embodiments, the first and second transistors Q1 and Q2 are electrically coupled at the first intermediate node M1 in series with each other between the input terminal IN and the intermediate reference terminal INT. In addition, the third and fourth transistors Q3 and Q4 are electrically coupled at the second intermediate node M2 in series with each other between the intermediate reference terminal INT and the reference potential terminal VSS. Moreover, the first and second capacitors Cr1 and Cr2 are electrically coupled at the third intermediate node M3 in series with each other between the input terminal IN and the intermediate reference terminal INT. In addition, the third and fourth capacitors Cr3 and Cr4 are electrically coupled at the fourth intermediate node M4 in series with each other between the intermediate reference terminal INT and the reference potential terminal VSS.

Referring to FIGS. 7B and 7C, the apparatus 100 further comprises a first diode Dp1 electrically coupled in parallel with the first capacitor Cr1, a second diode Dp2 electrically coupled in parallel with the second capacitor Cr2, a third diode Dp3 electrically coupled in parallel with the third capacitor Cr3, and a fourth diode Dp4 electrically coupled in parallel with the fourth capacitor Cr4.

In the embodiment shown in FIG. 7B, an anode of the first diode Dp1 is coupled to the third intermediate node M3, and a cathode of the first diode Dp1 is coupled to the input terminal IN. The anode of the second diode Dp2 is coupled to the reference potential terminal VSS, and a cathode of the second diode Dp2 is coupled to the third intermediate node M3. The anode of the third diode Dp3 is coupled to the fourth intermediate node M4, and a cathode of the third diode Dp3 is coupled to the input terminal IN. The anode of the fourth diode Dp4 is coupled to the reference potential terminal VSS, and a cathode of the fourth diode Dp4 is coupled to the fourth intermediate node M4.

In the embodiment shown in FIG. 7C, an anode of the first diode Dp1 is coupled to the third intermediate node M3, and a cathode of the first diode Dp1 is coupled to the input terminal IN. The anode of the second diode Dp2 is coupled to the intermediate reference terminal INT, and a cathode of the second diode Dp2 is coupled to the third intermediate node M3. The anode of the third diode Dp3 is coupled to the fourth intermediate node M4, and a cathode of the third diode Dp3 is coupled to the intermediate reference terminal INT. The anode of the fourth diode Dp4 is coupled to the reference potential terminal VSS, and a cathode of the fourth diode Dp4 is coupled to the fourth intermediate node M4.

The drive signals for the transistors Q1 to Q4 as shown in FIGS. 3 and 5 as well as the current flow patterns as illustrated in FIGS. 4A, 4B, 6A and 6B may be applied to the circuit implementations of FIGS. 7A, 7B and 7C.

Figure 8A:
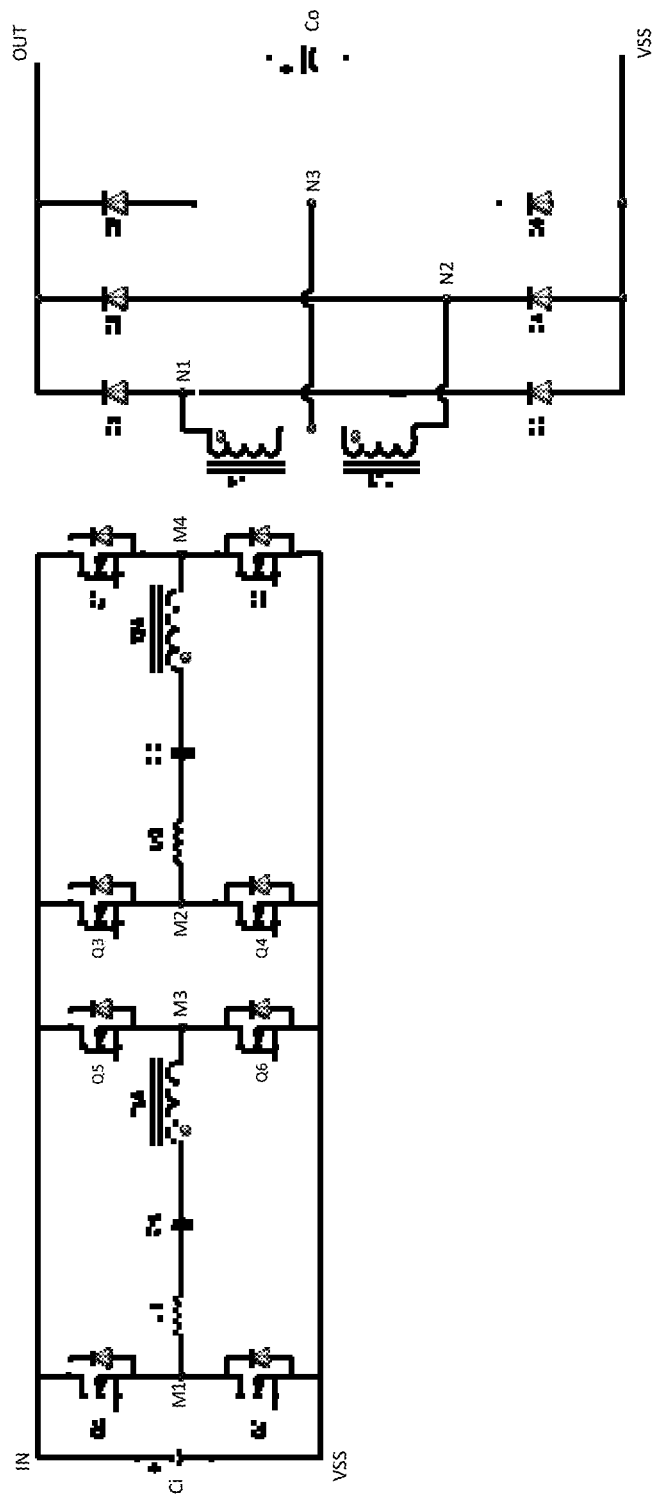
FIGS. 8A and 8B illustrate diagrams of other circuit implementations of an apparatus for DC-to-DC conversion according to embodiments of the present disclosure.
Figure 8B:
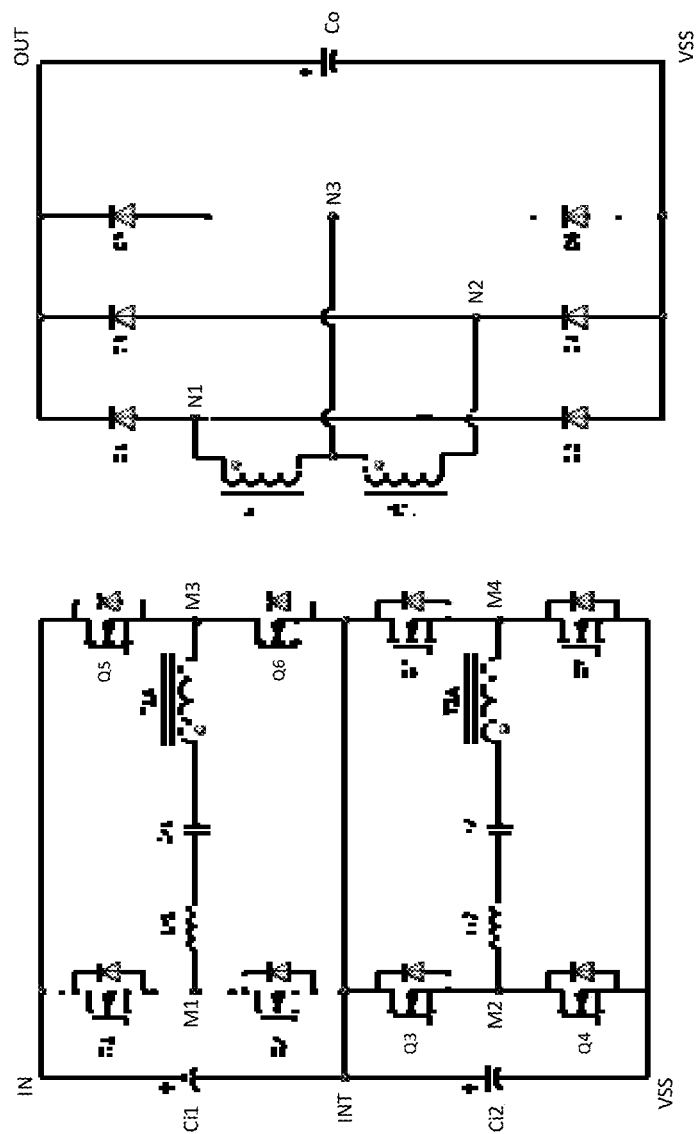

FIGS. 8A and 8B illustrate diagrams of other circuit implementations of the apparatus 100 according to embodiments of the present disclosure. The implementations as shown in FIGS. 8A and 8B are similar to those as discussed above with reference to FIGS. 2 and 7 except for the primary sides of the transformers. In the following, descriptions on the similar circuit topology and current flow pattern will be omitted.

In the embodiment shown in FIG. 8A, the apparatus 100 may comprise a first LLC topology circuit and a second LLC topology circuit. The first LLC topology circuit comprises the first winding T1A of the first transformer 102, the first inductor Lr1, and a first capacitor Cr1. In addition, the second LLC topology circuit comprises the third winding T2A of the second transformer 104, the second inductor Lr2, and a second capacitor Cr2. In some embodiments, the first inductor Lr1 is electrically coupled in serial with the first winding T1A, and the second inductor Lr2 is electrically coupled in serial with the third winding T2A. In some embodiments, the first inductor Lr1 may be included in the first transformer 102. In some embodiments, the second inductor Lr2 may be included in the second transformer 104.

In some embodiments, the apparatus 100 may comprise a first full-bridge circuit and a second full-bridge circuit as the switching circuits. The first full-bridge circuit comprises the first transistor Q1 and the second transistor Q2 electrically coupled at the first intermediate node M1 in series with each other between the input terminal IN and the reference potential terminal VSS. In addition, the second half-bridge circuit comprises the third transistor Q3 and the fourth transistor Q4 electrically coupled at the second intermediate node M2 in series with each other between the input terminal IN and the reference potential terminal VSS. Moreover, the first full-bridge circuit further comprises a fifth transistor Q5 and a sixth transistor Q6 electrically coupled at the third intermediate node M3 in series with each other between the input terminal IN and the reference potential terminal VSS. In addition, the second full-bridge circuit further comprises a seventh transistor Q7 and an eighth transistor Q8 electrically coupled at the fourth intermediate node M4 in series with each other between the input terminal IN and the reference potential terminal VSS.

In some embodiments, the first winding T1A of the first transformer 102 is electrically coupled to the first intermediate node M1 via the first capacitor Cr1 and the first inductor Lr1, and the third winding T2A of the second transformer 104 is electrically coupled to the second intermediate node M2 via the second capacitor Cr2 and the second inductor Lr2. In some embodiments, the first winding T1A of the first transformer 102 is further electrically coupled to the third intermediate node M3, and the third winding T2A of the second transformer 104 is further electrically coupled to the fourth intermediate node M4.

In some embodiments, the first winding T1A is electrically coupled to the input terminal IN via the first transistor Q1 or the fifth transistor Q5 and to the reference potential terminal VSS via the second transistor Q2 or the sixth transistor Q6. In some embodiments, the second winding T2A is electrically coupled to the input terminal IN via the third transistor Q3 or the seventh transistor Q7 and to the reference potential terminal VSS via the fourth transistor Q4 or the eighth transistor Q8.

In the embodiment shown in FIG. 8B, the apparatus 100 further comprises the intermediate reference terminal INT, the first input capacitor Ci1 electrically coupled between the input terminal IN and the intermediate reference terminal INT, and the second input capacitor Ci2 electrically coupled between the intermediate reference terminal INT and the reference potential terminal VSS.

In some embodiments, the first and second transistors Q1 and Q2 are electrically coupled at the first intermediate node M1 in series with each other between the input terminal IN and the intermediate reference terminal INT. The third and fourth transistors Q3 and Q4 are electrically coupled at the second intermediate node M2 in series with each other between the intermediate reference terminal INT and the reference potential terminal VSS. The fifth and sixth transistor Q5 and Q6 are electrically coupled at the third intermediate node M3 in series with each other between the input terminal IN and the intermediate reference terminal INT. In addition, the seventh and eighth transistors Q7 and Q8 are electrically coupled at the fourth intermediate node M4 in series with each other between the intermediate reference terminal INT and the reference potential terminal VSS.

Figure 9A:
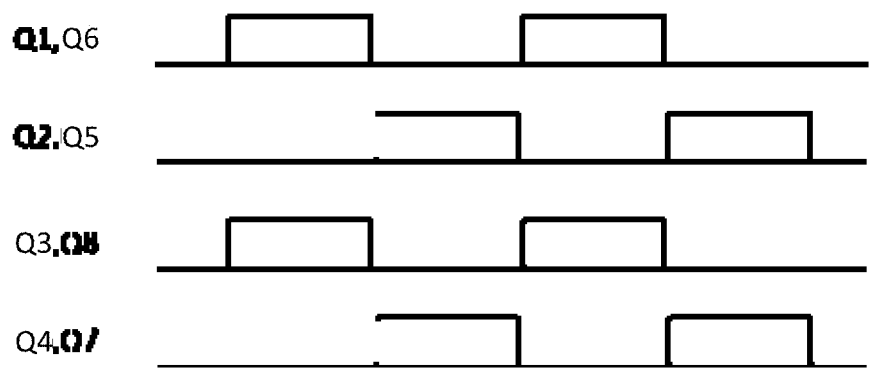
FIGS. 9A and 9B illustrate drive signals for an apparatus for DC-to-DC conversion according to embodiments of the present disclosure.
Figure 9B:
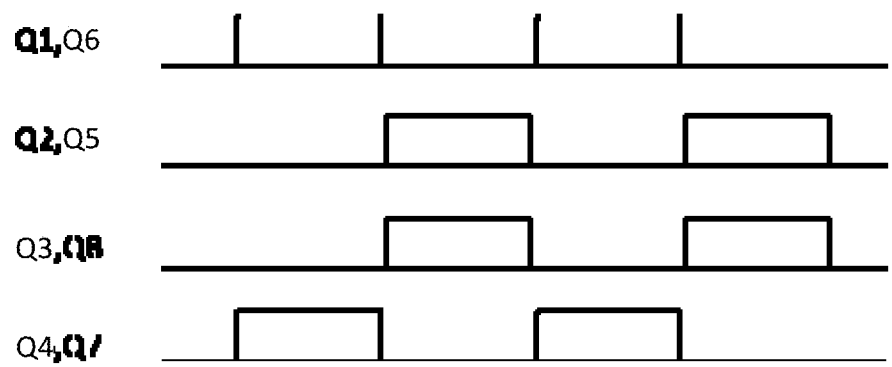

FIGS. 9A and 9B illustrate drive signals for the transistors Q1 to Q8 of the apparatus 100 as shown in FIGS. 8A and 8B.

As shown in FIG. 9A, the first, third, sixth and eighth transistors Q1, Q3, Q6 and Q8 are driven by the controller in a same phase, and the second, fourth, fifth and seventh transistors Q2, Q4, Q5 and Q7 are driven by the controller in a same phase.

Referring to FIGS. 8A, 8B and 9A, if the first, third, sixth and eighth transistors Q1, Q3, Q6 and Q8 are turned on and the second, fourth, fifth and seventh transistors Q2, Q4, Q5 and Q7 are turned off by the controller with the respective drive signals, the first current in the first winding T1A and the second current in the third winding T2A are controlled to flow into the dotted terminals in the first direction at the primary sides. Accordingly, the output currents in the second and fourth windings T1B and T2B flow from the dotted terminals in the same direction at the secondary sides, and the second and fourth windings T1B and T2B are electrically connected in serial with each other to output the high voltage.

Moreover, if the first, third, sixth and eighth transistors Q1, Q3, Q6 and Q8 are turned off and the second, fourth, fifth and seventh transistors Q2, Q4, Q5 and Q7 are turned on by the controller with the respective drive signals, the first current in the first winding T1A and the second current in the third winding T2A are controlled to flow from the dotted terminals in the second direction at the primary sides. Accordingly, the output currents in the second and fourth windings T1B and T2B flow into the dotted terminals in the same direction at the secondary sides, and the second and fourth windings T1B and T2B are electrically connected in serial with each other to output the high voltage.

Further, as shown in FIG. 9B, the first, fourth, sixth and seventh transistors Q1, Q4, Q6 and Q7 are driven by the controller in a same phase, and the second, third, fifth and eighth transistors Q2, Q3, Q5 and Q8 are driven by the controller in a same phase.

Referring to FIGS. 8A, 8B and 9B, if the first, fourth, sixth and seventh transistors Q1, Q4, Q6 and Q7 are turned on and the second, third, fifth and eighth transistors Q2, Q3, Q5 and Q8 are turned off by the controller with the respective drive signals, the first current in the first winding T1A is controlled to flow into the dotted terminal in the first direction and the second current in the third winding T2A is controlled to flow from the dotted terminal in the second direction at the primary sides. Accordingly, the output current in the second winding T1B flows from the dotted terminal and the output current in the fourth winding T2B flows into the dotted terminals at the secondary sides, and the second and fourth windings T1B and T2B are equivalent to be electrically connected in parallel with each other to output the low voltage.

Moreover, if the first, fourth, sixth and seventh transistors Q1, Q4, Q6 and Q7 are turned off and the second, third, fifth and eighth transistors Q2, Q3, Q5 and Q8 are turned on by the controller with the respective drive signals, the first current in the first winding T1A is controlled to flow from the dotted terminal in the second direction and the second current in the third winding T2A is controlled to flow into the dotted terminal in the first direction at the primary sides. Accordingly, the output current in the second winding T1B flows into the dotted terminal and the output current in the fourth winding T2B flows from the dotted terminals at the secondary sides, and the second and fourth windings T1B and T2B are equivalent to be electrically connected in parallel with each other to output the low voltage.

It should be noted that FIGS. 8A and 8B are merely example implementations without suggesting any limitations as to the scope of the present disclosure. For example, in alternative embodiments, the doted terminal of the second winding T1B and the dotted terminal of the fourth winding T2B may be both electrically coupled to the third node N3, or may be electrically coupled to the first node N1 and the second node N2, respectively. In such embodiments, the second and fourth windings T1B and T2B are electrically coupled in series with each other when the output currents in the second and fourth windings T1B and T2B flow in the different directions, and in parallel with each other when the output currents in the second and fourth windings T1B and T2B flow in the same direction.

Figure 10A:
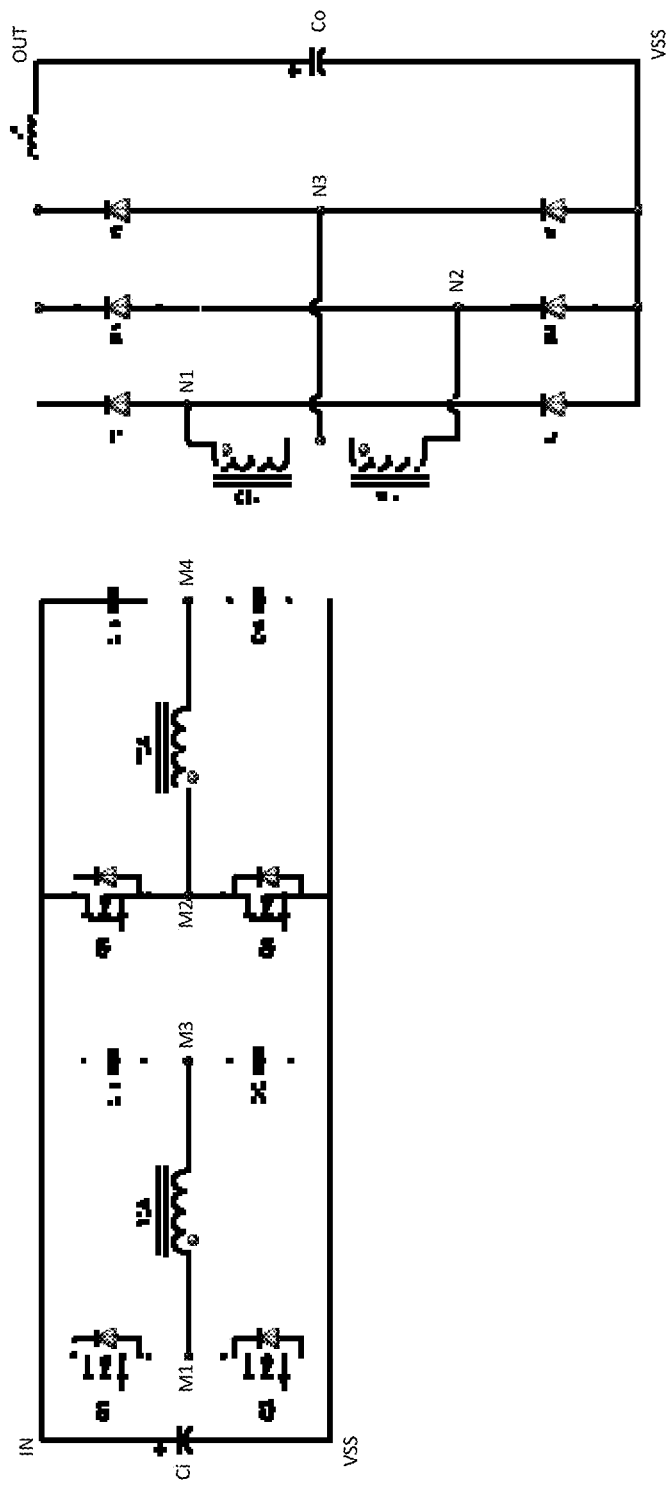
FIGS. 10A and 10B illustrate diagrams of other circuit implementations of an apparatus for DC-to-DC conversion according to embodiments of the present disclosure.
Figure 10B:
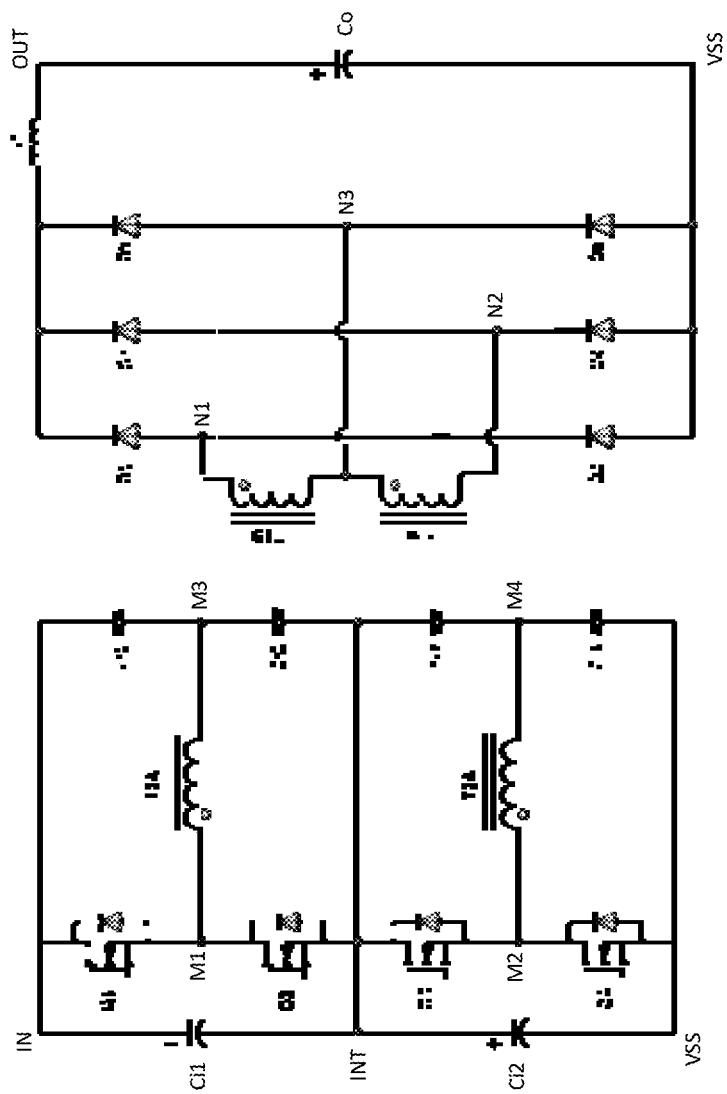

FIGS. 10A and 10B illustrate diagrams of other circuit implementations of the apparatus 100 according to embodiments of the present disclosure. The implementations as shown in FIGS. 10A and 10B are similar to those as discussed above with reference to FIGS. 2 and 7 except that the first and second inductors Lr1 and Lr2 are omitted at the primary sides of the transformers and an output inductor Lf is added at the secondary sides of the transformers. In the following, descriptions on the similar circuit topology, control scheme and current flow pattern will be omitted.

Referring to FIGS. 10A and 10B, in some embodiments, the first winding T1A is electrically directly coupled to the first intermediate node M2, and the third winding T2A is electrically directly coupled to the second intermediate node M2. Moreover, the output inductor Lf is electrically coupled between the output terminal OUT and a common node of cathodes of the first, third and fifth rectifying elements D1, D3 and D5. In some embodiments, the output capacitor Co together with the output inductor Lf serve as the filter, and the output voltage is provided form the output terminal OUT between the output inductor Lf and the output capacitor Co.

Figure 11A:
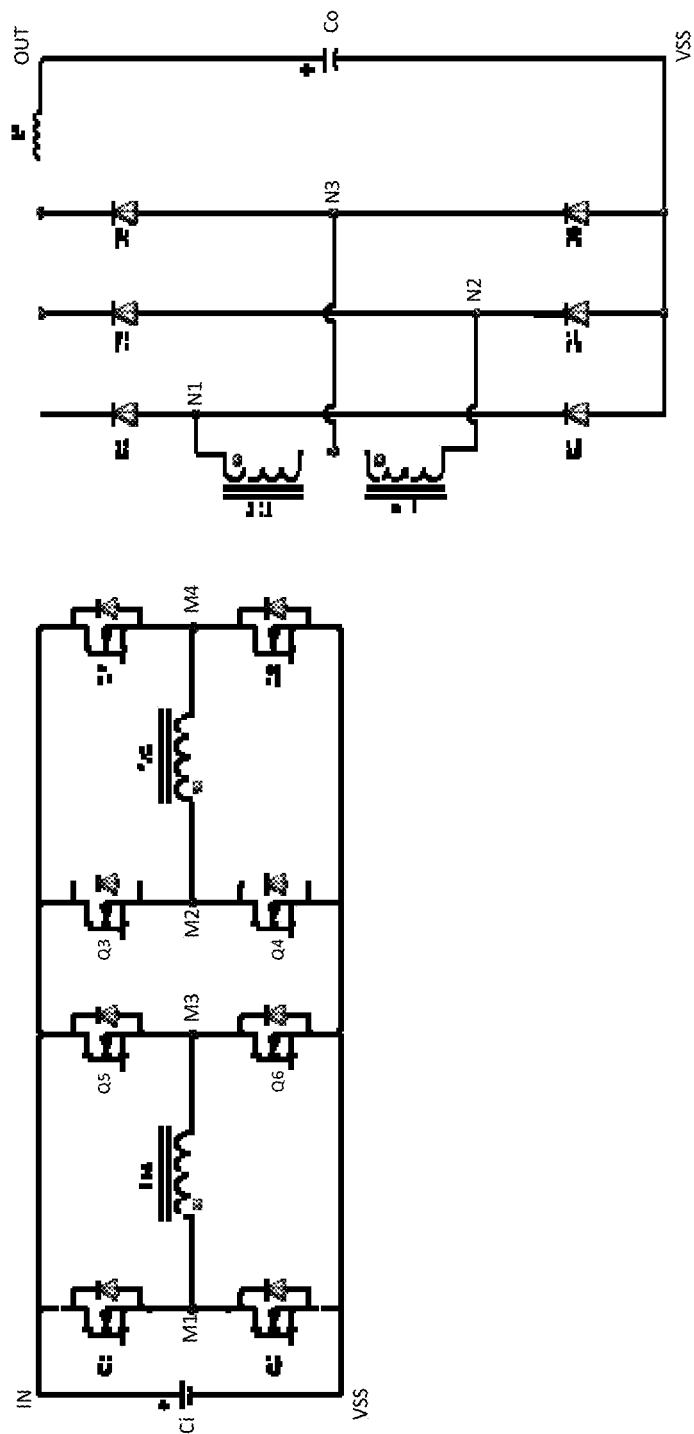
FIGS. 11A and 11B illustrate diagrams of other circuit implementations of an apparatus for DC-to-DC conversion according to embodiments of the present disclosure.
Figure 11B:
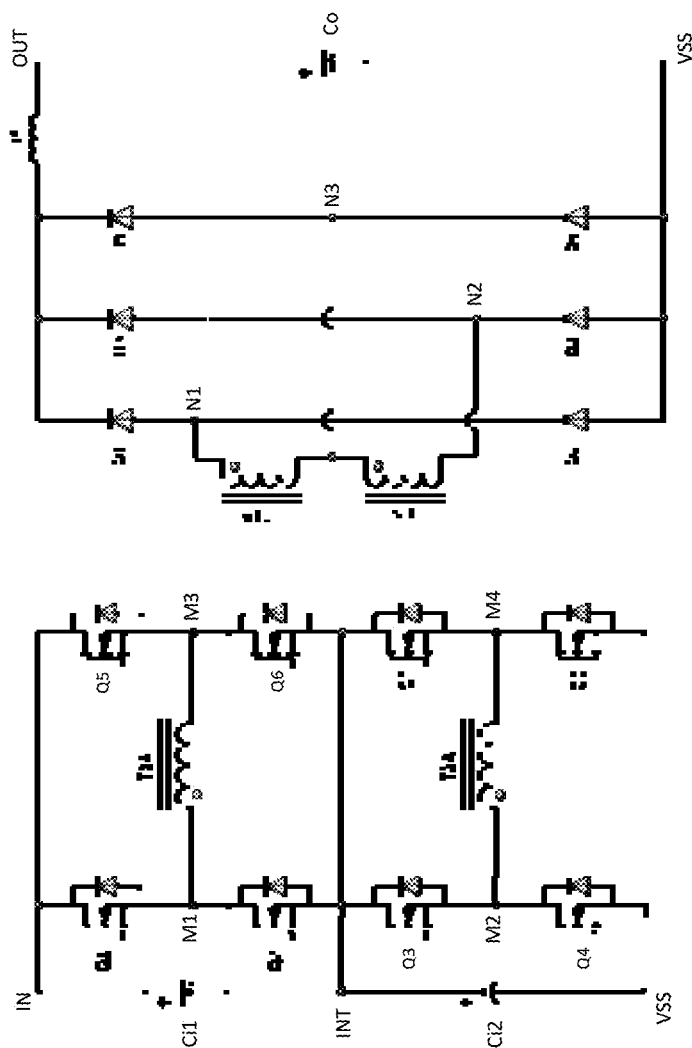

FIGS. 11A and 11B illustrate diagrams of other circuit implementations of the apparatus 100 according to embodiments of the present disclosure. The implementations as shown in FIGS. 11A and 11B are similar to those as discussed above with reference to FIGS. 10A and 10B except for the primary sides of the transformers. In the following, descriptions on the similar circuit topology, control scheme and current flow pattern will be omitted.

In the embodiment shown in FIG. 11A, the fifth and sixth transistors Q5 and Q6 are electrically coupled at the third intermediate node M3 in series with each other between the input terminal IN and the reference potential terminal VSS. In addition, the seventh and eighth transistors Q7 and Q8 are electrically coupled at the fourth intermediate node M4 in series with each other between the input terminal IN and the reference potential terminal VSS.

Moreover, in the embodiment shown in FIG. 11B, the fifth and sixth transistors Q5 and Q6 are electrically coupled at the third intermediate node M3 in series with each other between the input terminal IN and the intermediate reference terminal INT. In addition, the seventh and eighth transistors Q7 and Q8 are electrically coupled at the fourth intermediate node M4 in series with each other between the intermediate reference terminal INT and the reference potential terminal VSS.

Figure 12A:
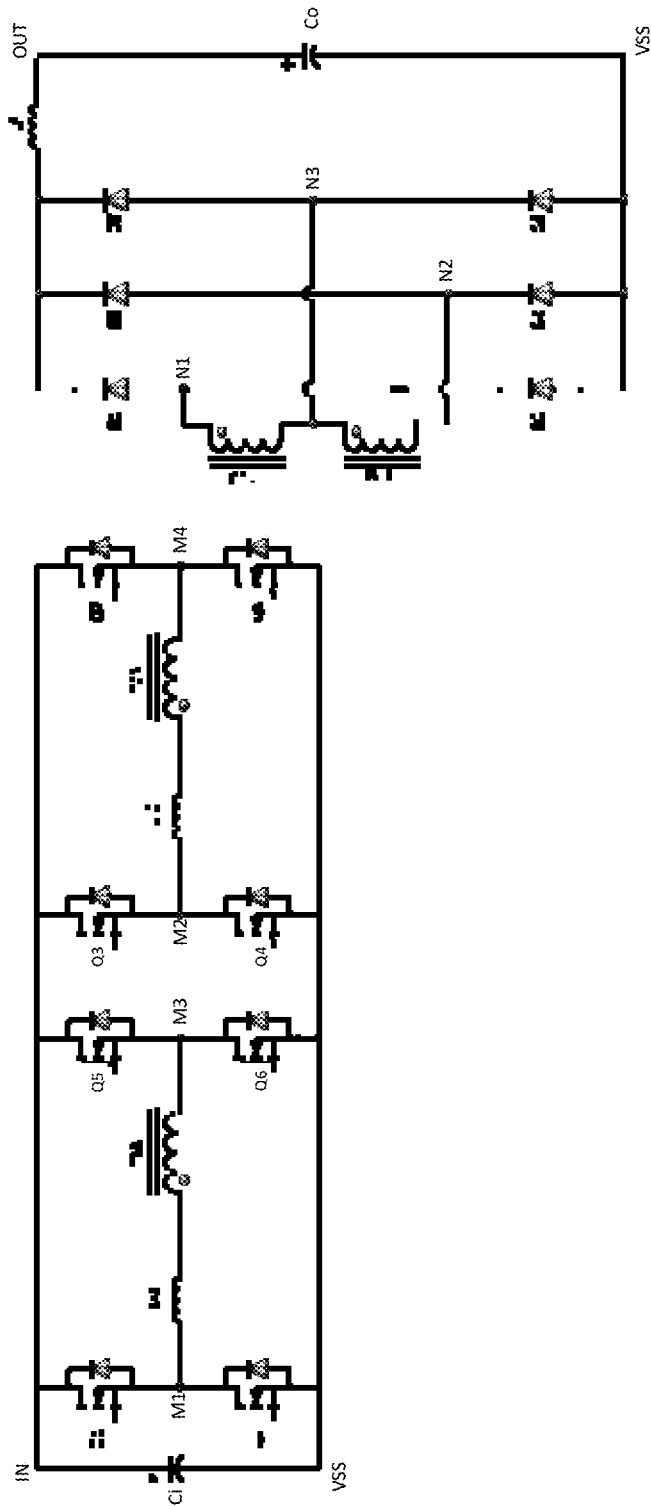
FIGS. 12A and 12B illustrate diagrams of other circuit implementations of an apparatus for DC-to-DC conversion according to embodiments of the present disclosure.
Figure 12B:
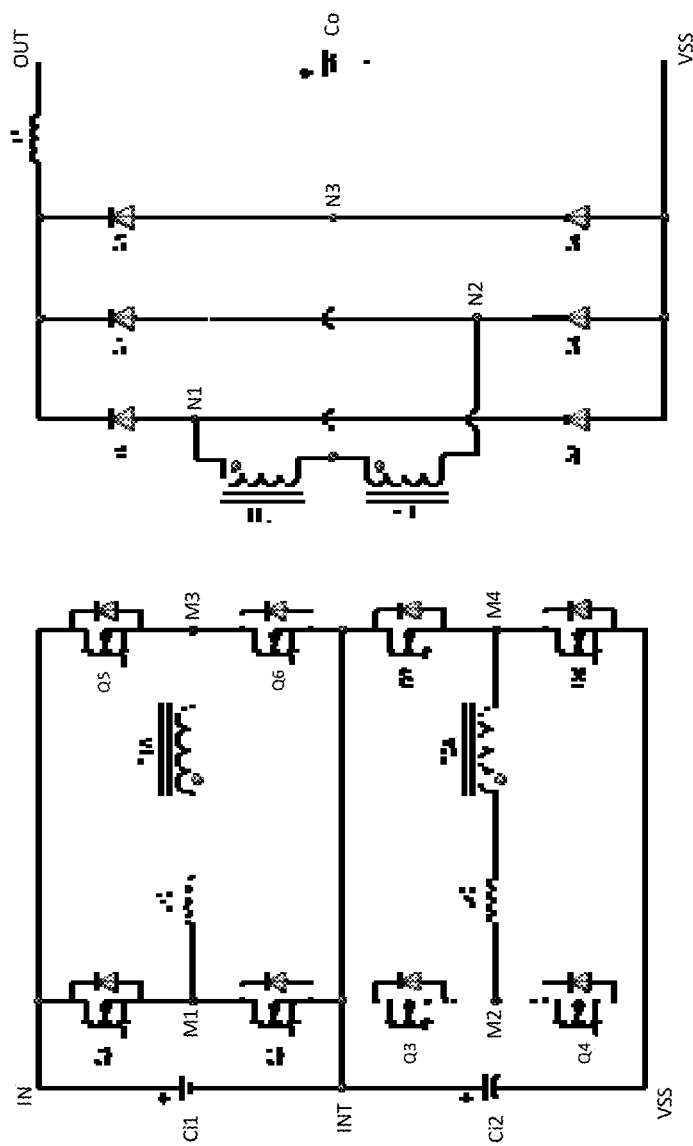

FIGS. 12A and 12B illustrate diagrams of other circuit implementations of the apparatus 100 according to embodiments of the present disclosure. The implementations as shown in FIGS. 12A and 12B are similar to those as discussed above with reference to FIGS. 11A and 11B except that the first and second inductors Lr1 and Lr2 are added at the primary sides of the transformers and there is a phase shift between the drive signals. In the following, descriptions on the similar circuit topology and current flow pattern will be omitted.

Referring to FIGS. 12A and 12B, the first inductor Lr1 is coupled between the first intermediate node M1 and the first winding T1A, and the second inductor Lr2 is coupled between the second intermediate node M2 and the third winding T2A.

Figure 13A:
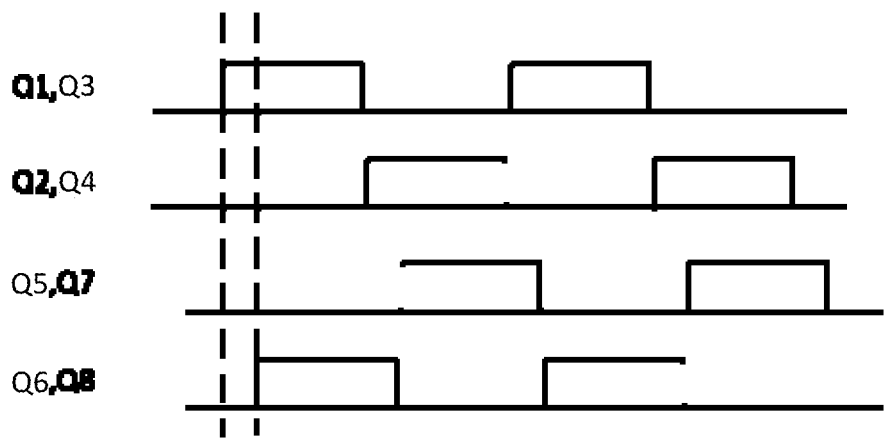
FIGS. 13A and 13B illustrate drive signals for an apparatus for DC-to-DC conversion according to embodiments of the present disclosure.
Figure 13B:
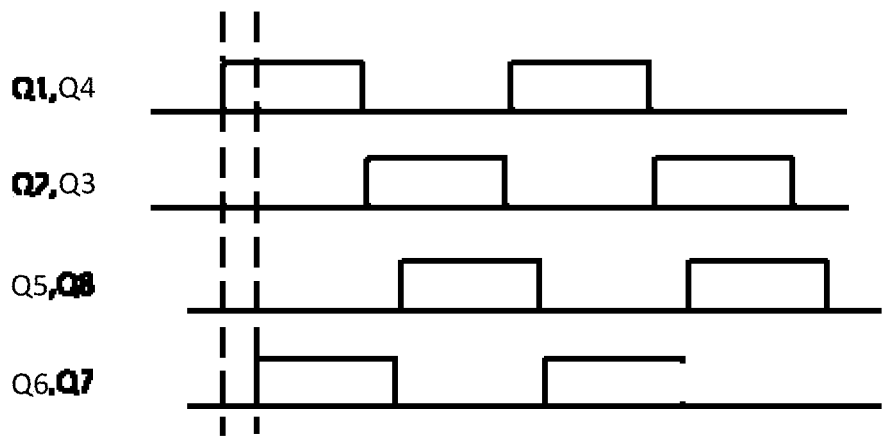

FIGS. 13A and 13B illustrate drive signals for the transistors Q1 to Q8 of the apparatus 100 as shown in FIGS. 12A and 12B.

Referring to FIG. 13A, there is a phase shift between the drive signals for the first and third transistors Q1 and Q3 and the drive signals for the sixth and eighth transistors Q6 and Q8, and there is a phase shift between the drive signals for the second and fourth transistors Q2 and Q4 and the drive signals for the fifth and seventh transistors Q5 and Q7. That is, a turn-on timing of the sixth and eighth transistors Q6 and Q8 is delayed with respect to a turn-on timing of the first and third transistors Q1 and Q3, and a turn-on timing of the fifth and seventh transistors Q5 and Q7 is delayed with respect to a turn-on timing of the second and fourth transistors Q2 and Q4.

Moreover, referring to FIG. 13B, there is a phase shift between the drive signals for the first and fourth transistors Q1 and Q4 and the drive signals for the sixth and seventh transistors Q6 and Q7, and there is a phase shift between the drive signals for the second and third transistors Q2 and Q3 and the drive signals for the fifth and eighth transistors Q5 and Q8. That is, a turn-on timing of the sixth and seventh transistors Q6 and Q7 is delayed with respect to a turn-on timing of the first and fourth transistors Q1 and Q4, and a turn-on timing of the fifth and eighth transistors Q5 and Q8 is delayed with respect to a turn-on timing of the second and third transistors Q2 and Q3.

Figure 14A:
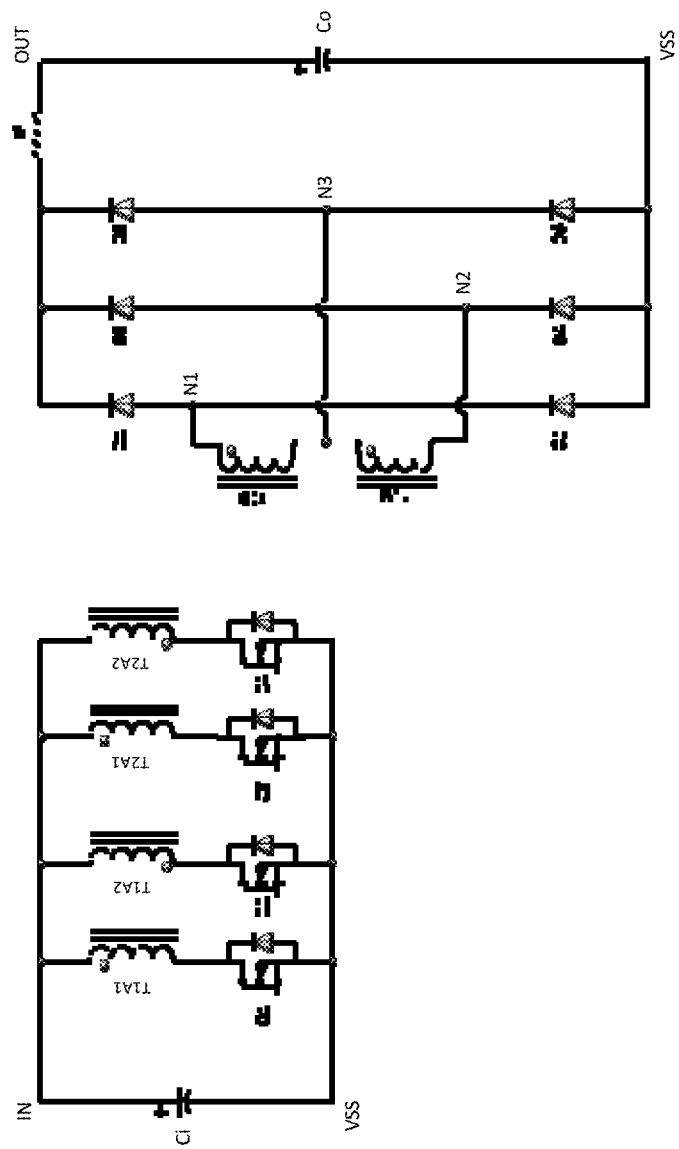
FIGS. 14A and 14B illustrate diagrams of other circuit implementations of an apparatus for DC-to-DC conversion according to embodiments of the present disclosure.
Figure 14B:
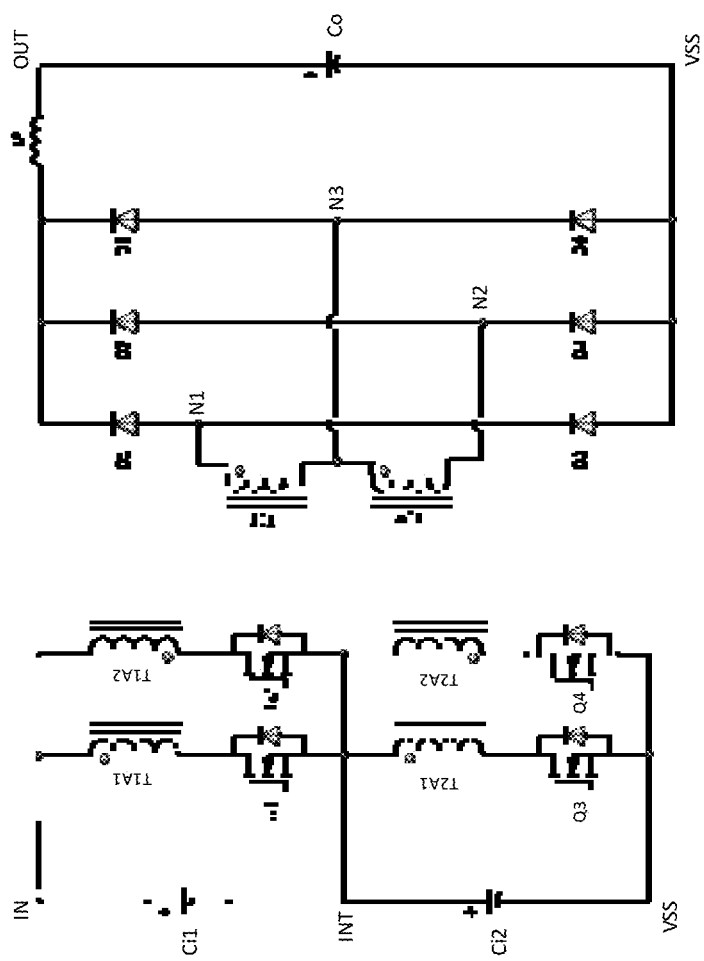

FIGS. 14A and 14B illustrate diagrams of other circuit implementations of the apparatus 100 according to embodiments of the present disclosure.

In the embodiment shown in FIG. 14A, the first transformer 102 comprises the first winding T1A and the second winding T1B, and the first winding T1A may comprise a first sub winding T1A1 and a second sub winding T1A2. In addition, the second transformer 104 comprises the third winding T2A and the fourth winding T2B, and the third winding T2A may comprise a third sub winding T2A1 and a fourth sub winding T2A2.

In some embodiments, the apparatus 100 may comprise first to fourth transistors Q1 to Q4 which constitute the switching circuit. The first transistor Q1 is electrically coupled between the reference potential terminal VSS and the first sub winding T1A1. The second transistor Q2 is electrically coupled between the reference potential terminal VSS and the second sub winding T1A2. The third transistor Q3 is electrically coupled between the reference potential terminal VSS and the third sub winding T2A1. In addition, the fourth transistor Q4 is electrically coupled between the reference potential terminal VSS and the fourth sub winding T2A2.

In some embodiments, the first sub winding T1A1 comprises a dotted terminal electrically coupled to the input terminal IN and an opposite terminal electrically coupled to the first transistor Q1. The second sub winding T1A2 comprises a dotted terminal electrically coupled to the second transistor Q2 and an opposite terminal electrically coupled to the input terminal IN. The third sub winding T2A1 comprises a dotted terminal electrically coupled to the input terminal IN and an opposite terminal electrically coupled to the third transistor Q3. In addition, the fourth sub winding T2A2 comprises a dotted terminal electrically coupled to the fourth transistor Q4 and an opposite terminal electrically coupled to the input terminal IN.

Moreover, in the embodiment shown in FIG. 14B, the apparatus 100 may further comprise the intermediate reference terminal INT. The first transistor Q1 is electrically coupled between the intermediate reference terminal INT and the first sub winding T1A1. The second transistor Q2 is electrically coupled between the intermediate reference terminal INT and the second sub winding T1A2. The third transistor Q3 is electrically coupled between the reference potential terminal VSS and the third sub winding T2A1. In addition, the fourth transistor Q4 is electrically coupled between the reference potential terminal VSS and the fourth sub winding T2A2.

In some embodiments, the first sub winding T1A1 comprises a dotted terminal electrically coupled to the input terminal IN and an opposite terminal electrically coupled to the first transistor Q1. The second sub winding T1A2 comprises a dotted terminal electrically coupled to the second transistor Q2 and an opposite terminal electrically coupled to the input terminal IN. The third sub winding T2A1 comprises a dotted terminal electrically coupled to the intermediate reference terminal INT and an opposite terminal electrically coupled to the third transistor Q3. In addition, the fourth sub winding T2A2 comprises a dotted terminal electrically coupled to the fourth transistor Q4 and an opposite terminal electrically coupled to the intermediate reference terminal INT.

Figure 15A:
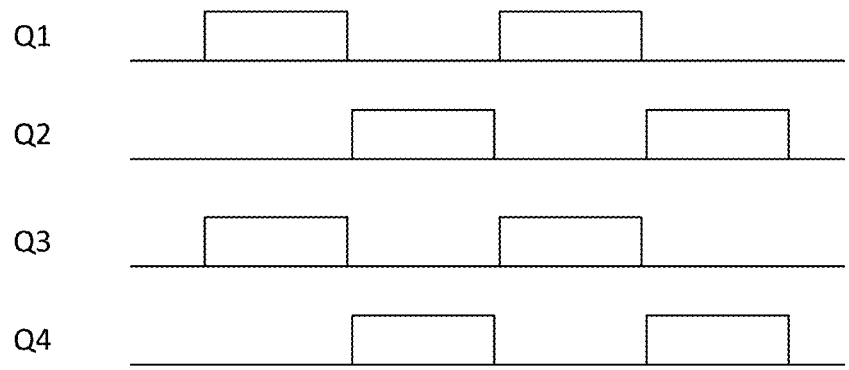
FIGS. 15A and 15B illustrate drive signals for an apparatus for DC-to-DC conversion according to embodiments of the present disclosure.
Figure 15B:
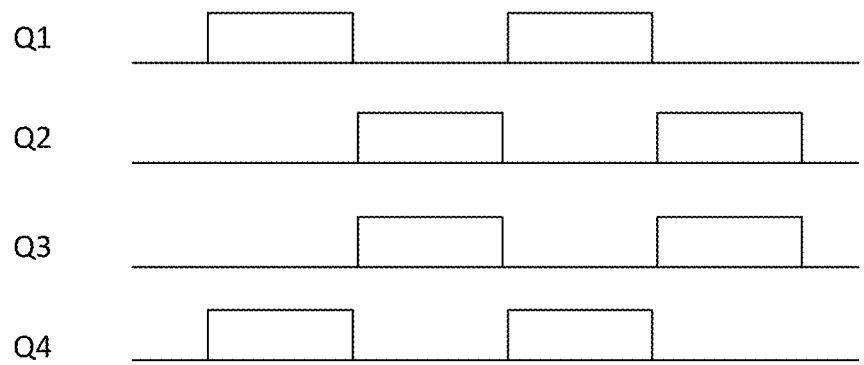

FIGS. 15A and 15B illustrate drive signals for the transistors Q1 to Q4 of the apparatus 100 as shown in FIGS. 14A and 14B.

Referring to FIG. 15A, the first and third transistors Q1 and Q3 are driven by the controller in a same phase with the corresponding drive signals, and the second and fourth transistors Q2 and Q4 are driven by the controller in a same phase with the corresponding drive signals.

Referring to FIGS. 14A, 14B and 15A, if the first and third transistors Q1 and Q3 are turned on and the second and fourth transistors Q2 and Q4 are turned off by the controller with the respective drive signals, the first current flows in the first sub winding T1A1 of the first winding T1A and flows into the dotted terminal, and the second current flows in the third sub winding T2A1 of the third winding T2A and flows into the dotted terminals. Accordingly, the output currents in the second and fourth windings T1B and T2B flow from the dotted terminals in the same direction at the secondary sides, and the second and fourth windings T1B and T2B are electrically connected in serial with each other to output the high voltage.

Moreover, if the first and third transistors Q1 and Q3 are turned off and the second and fourth transistors Q2 and Q4 are turned on by the controller with the respective drive signals, the first current flows in the second sub winding T1A2 of the first winding T1A and flows from the dotted terminal, and the second current flows in the fourth sub winding T2A2 of the third winding T2A and flows from the dotted terminals. Accordingly, the output currents in the second and fourth windings T1B and T2B flow into the dotted terminals in the same direction at the secondary sides, and the second and fourth windings T1B and T2B are electrically connected in serial with each other to output the high voltage.

Further, referring to FIG. 15B, the first and fourth transistors Q1 and Q4 are driven by the controller in a same phase with the corresponding drive signals, and the second and third transistors Q2 and Q3 are driven by the controller in a same phase with the corresponding drive signals.

Referring to FIGS. 14A, 14B and 15B, if the first and fourth transistors Q1 and Q4 are turned on and the second and third transistors Q2 and Q3 are turned off by the controller with the respective drive signals, the first current flows in the first sub winding T1A1 of the first winding T1A and flows into the dotted terminal, and the second current flows in the fourth sub winding T2A2 of the third winding T2A and flows from the dotted terminals. Accordingly, the output current in the second winding T1B flows from the dotted terminal and the output current in the fourth winding T2B flows into the dotted terminals at the secondary sides, and thus the second and fourth windings T1B and T2B are equivalent to be electrically connected in parallel with each other to output the low voltage.

Moreover, if the first and fourth transistors Q1 and Q4 are turned off and the second and third transistors Q2 and Q3 are turned on by the controller with the respective drive signals, the first current flows in the second sub winding T1A2 of the first winding T1A and flows from the dotted terminal, and the second current flows in the third sub winding T2A1 of the third winding T2A and flows into the dotted terminals. Accordingly, the output current in the second winding T1B flows into the dotted terminal and the output current in the fourth winding T2B flows from the dotted terminals at the secondary sides, and thus the second and fourth windings T1B and T2B are equivalent to be electrically connected in parallel with each other to output the low voltage.

Figure 16A:
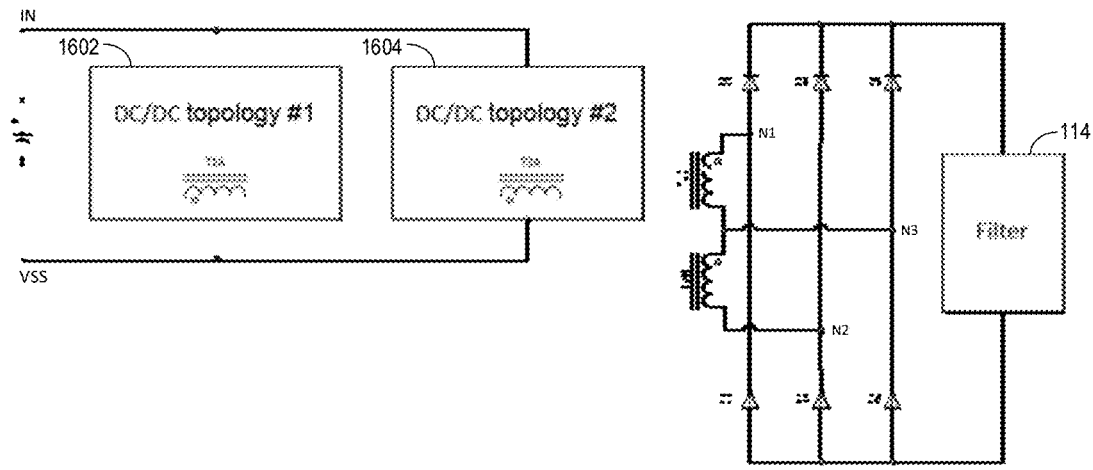
FIGS. 16A and 16B illustrate diagrams of other circuit implementations of an apparatus for DC-to-DC conversion according to embodiments of the present disclosure.
Figure 16B:
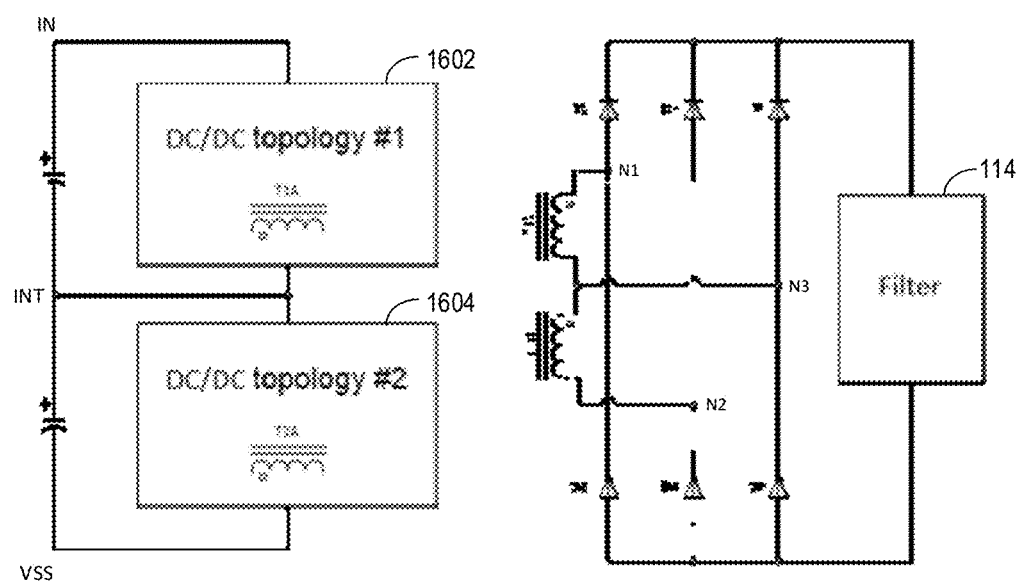

FIGS. 16A and 16B illustrate diagrams of other circuit implementations of the apparatus 100 according to embodiments of the present disclosure. In some embodiments, the apparatus 100 may comprise a first DC-to-DC converter circuit 1602 electrically coupled to the first winding T1A of the first transformer 102 and a second DC-to-DC converter circuit 1604 electrically coupled to the third winding T2A of the second transformer 104.

Referring to FIG. 16A, the first DC-to-DC converter circuit 1602 is electrically coupled in series between the input terminal IN and the reference potential terminal VSS. In addition, the second DC-to-DC converter circuit 1604 is electrically coupled in series with each other between the input terminal IN and the reference potential terminal VSS.

Moreover, referring to FIG. 16B, the first DC-to-DC converter circuit 1602 is electrically coupled in series between the input terminal IN and the intermediate reference terminal INT. In addition, the second DC-to-DC converter circuit 1604 is electrically coupled in series with each other between the intermediate reference terminal INT and the reference potential terminal VSS.

At the secondary sides of the circuit implementations of FIGS. 16A and 16B, when the output currents in the second and fourth windings T1B and T2B are controlled to flow in the same direction, the second and fourth windings T1B and T2B are electrically coupled in series with each other to output the high voltage. Moreover, when the output currents in the second and fourth windings T1B and T2B are controlled to flow in the different directions, the second and fourth windings T1B and T2B are electrically coupled in parallel with each other to output the low voltage.

It should be noted that FIGS. 14A, 14B, 16A and 16B are merely example implementations without suggesting any limitations as to the scope of the present disclosure. For example, in alternative embodiments, the doted terminal of the second winding T1B and the dotted terminal of the fourth winding T2B may be both electrically coupled to the third node N3, or may be electrically coupled to the first node N1 and the second node N2, respectively. In such embodiments, the second and fourth windings T1B and T2B are electrically coupled in series with each other to output the high voltage when the output currents in the second and fourth windings T1B and T2B are controlled to flow in the different directions, and in parallel with each other to output the low voltage when the output currents in the second and fourth windings T1B and T2B are controlled to flow in the same direction.

Figure 17A:
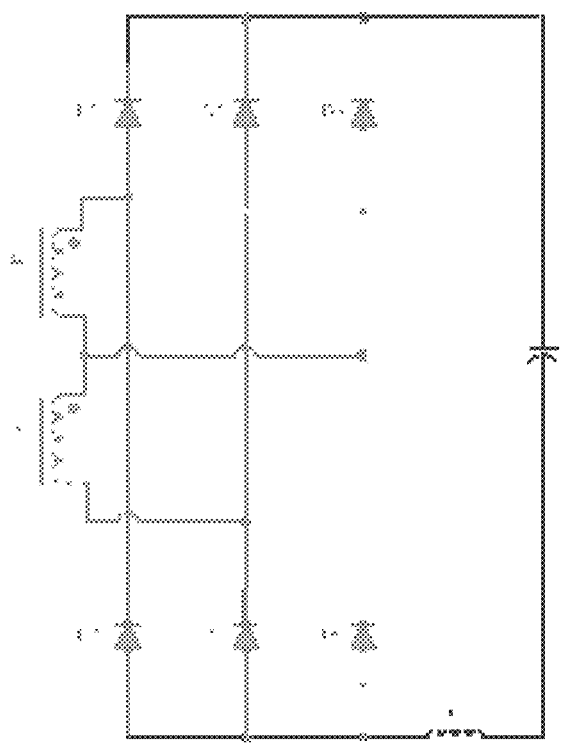
FIGS. 17A, 17B and 17C illustrate diagrams of other circuit implementations of an apparatus for DC-to-DC conversion according to embodiments of the present disclosure.
Figure 17B:
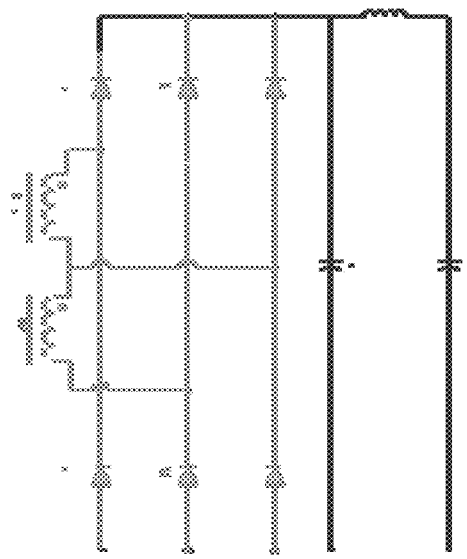
Figure 17C:
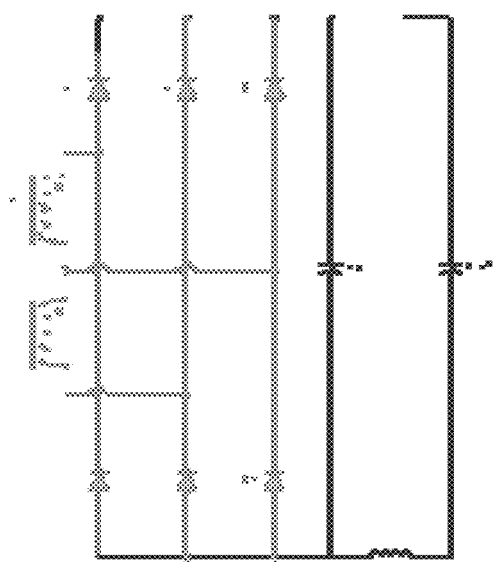

It should be noted that the circuit implementation of the filter 114 is not limited to those as shown in FIGS. 2 and 10A. FIGS. 17A, 17B and 17C illustrate diagrams of other circuit implementations of the filter 114 of the apparatus 100 according to the embodiments of the present disclosure.

In the alternative embodiment shown in FIG. 17A, the output inductor Lf is electrically coupled between the output capacitor Co and a common node of the anodes of the second, fourth and sixth rectifying elements D2, D4 and D6.

In the alternative embodiment shown in FIG. 17B, a first output capacitor Co1 is electrically coupled between a common node of the cathodes of the first, third and fifth rectifying elements D1, D3 and D5 and a common node of the anodes of the second, fourth and sixth rectifying elements D2, D4 and D6. The output inductor Lf is electrically coupled between the common node of the cathodes of the first, third and fifth rectifying elements D1, D3 and D5 and a second output capacitor Co2. In addition, the second output capacitor Co2 is electrically coupled between the output inductor Lf and the common node of the anodes of the second, fourth and sixth rectifying elements D2, D4 and D6.

In the alternative embodiment shown in FIG. 17C, a first output capacitor Co1 is electrically coupled between a common node of the cathodes of the first, third and fifth rectifying elements D1, D3 and D5 and a common node of the anodes of the second, fourth and sixth rectifying elements D2, D4 and D6. The output inductor Lf is electrically coupled between the common node of the anodes of the second, fourth and sixth rectifying elements D2, D4 and D6 and a second output capacitor Co2. In addition, the second output capacitor Co2 is electrically coupled between the output inductor Lf and the common node of the cathodes of the first, third and fifth rectifying elements D1, D3 and D5.

Figure 18:
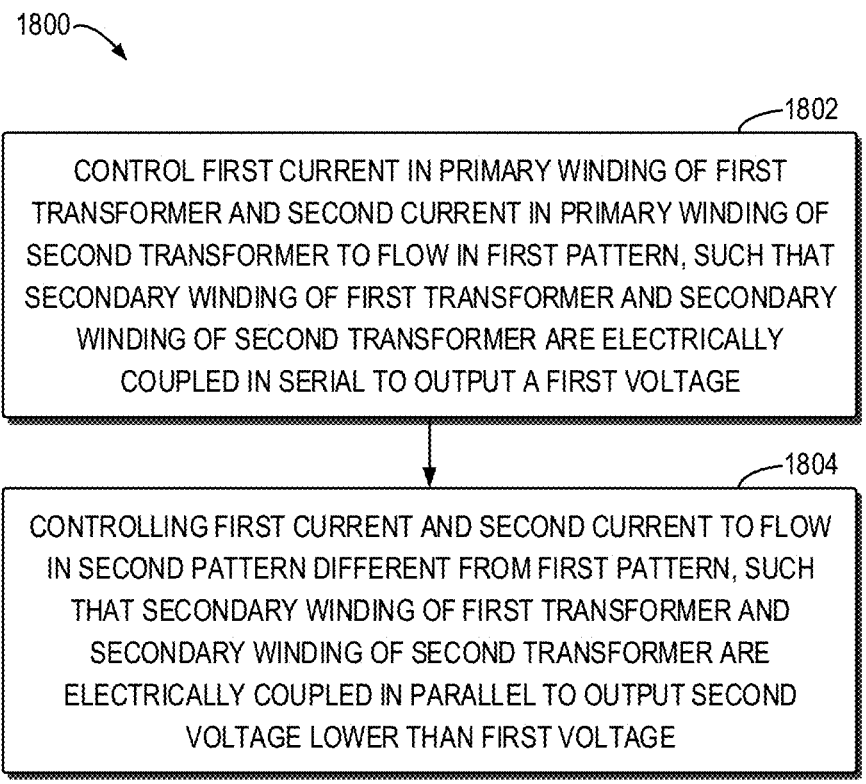
FIG. 18 illustrates a flowchart of a method for DC-to-DC conversion according to an embodiment of the present disclosure.

FIG. 18 illustrates a flowchart of a method 1800 for DC-to-DC conversion according to an embodiment of the present disclosure. Referring to FIG. 18, the method 1800 comprises blocks 1802 and 1804.

At block 1802, the method 1800 comprises controlling the first current in the first winding T1A of the first transformer 102 and the second current in the third winding T2A of the second transformer 104 to flow in the first pattern, such that the second winding T1B of the first transformer 102 and the fourth winding T2B of the second transformer 104 are electrically coupled in serial to output the first voltage. In some embodiments, controlling the first current and the second current to flow in the first pattern comprises controlling the first current and the second current to flow in the same direction.

At block 1804, the method 1800 comprises controlling the first current and the second current to flow in the second pattern different from the first pattern, such that the second winding T1B of the first transformer 102 and the fourth winding T2B of the second transformer 104 are electrically coupled in parallel to output the second voltage lower than the first voltage. In some embodiment, controlling the first current and the second current to flow in the second pattern comprises controlling the first current and the second current to flow in the different directions.

Alternatively, in other embodiments, controlling the first current and the second current to flow in the first pattern comprises controlling the first current and the second current to flow in the different directions, and controlling the first current and the second current to flow in the second pattern comprises controlling the first current and the second current to flow in the same direction.

In some embodiments, controlling the first current comprises supplying the first control signal to the first switching circuit 108 electrically coupled to the first winding T1A of the first transformer 102. Moreover, controlling the second current comprises supplying the second control signal to the second switching circuit 110 electrically coupled to the third winding T2A of the second transformer 104.

In some embodiments, the first and second currents are controlled to flow in the first direction by turning on a first high-side transistor Q1 electrically coupled to the first winding T1A of the first transformer 102 and a second high-side transistor Q3 electrically coupled to the third winding T2A of the second transformer 104, and by turning off a first low-side transistor Q2 electrically coupled to the first winding T1A of the first transformer 102 and a second low-side transistor Q4 electrically coupled to the third winding T2A of the second transformer 104. Moreover, the first current and the second current are controlled to flow in the second direction opposite to the first direction by turning off the first high-side transistor Q1 and the second high-side transistor Q3 and turning on the first low-side transistor Q2 and the second low-side transistor Q4.

In some embodiments, the first current is controlled to flow in the first direction and the second current is controller to flow in the second direction by turning on the first high-side transistor Q1 and the second low-side transistor Q4 and turning off the first low-side transistor Q2 and the second high-side transistor Q3. Moreover, the first current is controlled to flow in the second direction and the second current is controller to flow in the first direction by turning off the first high-side transistor Q1 and the second low-side transistor Q4 and turning on the first low-side transistor Q2 and the second high-side transistor Q3.

In embodiments of the present disclosure, a computer-readable medium may be provided. The computer-readable medium comprises computer-readable instructions stored thereon. The computer-readable instructions cause a device to perform the method as described above when executed by the device.

According to the embodiments of the present disclosure, the flow directions of the currents in the primary windings of the transformers are controlled, and thus the flow directions of the output currents in the secondary windings of the transformers are controlled. When the output currents in the secondary windings of the transformers are controlled to flow in a pattern such that the secondary windings of the transformers are electrically coupled in series with each other, the high voltage is output by the DC-to-DC conversion. Moreover, when the output currents in the secondary windings of the transformers are controlled to flow in another pattern such that the secondary windings of the transformers are electrically coupled in parallel with each other, the low voltage is output by the DC-to-DC conversion. In this way, the wide range of the output voltage and the constant output power may be achieved without an additional power stage, and the design of the individual transformer may be optimized. Therefore, the efficiency and the power density are improved with fewer components.

While several details are contained in the above discussions, these should not be construed as limitations on the scope of the subject matter described herein, but rather as descriptions of features that may be specific to particular embodiments. The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but to be accorded the widest scope consistent with the principles and novel features disclosed herein.

What is claimed is:

1. An apparatus for DC-to-DC conversion, comprising:
a first transformer comprising a first winding at a primary side and a second winding at a secondary side;
a second transformer comprising a third winding at a primary side and a fourth winding at a secondary side; and
a controller configured to:
control a first current in the first winding of the first transformer and a second current in the third winding of the second transformer to flow in a first pattern, such that the second winding of the first transformer and the fourth winding of the second transformer are electrically coupled in serial to output a first voltage, and
control the first current and the second current to flow in a second pattern different from the first pattern, such that the second winding of the first transformer and the fourth winding of the second transformer are electrically coupled in parallel to output a second voltage lower than the first voltage,
wherein the controller is configured to control the first current and the second current to flow in different directions in the first pattern, and control the first current and the second current to flow in a same direction in the second pattern.

2. The apparatus of claim 1, wherein:
the second winding of the first transformer comprises a first terminal and a second terminal, the fourth winding of the second transformer comprises a third terminal and a fourth terminal, and the second terminal of the second winding is electrically coupled to the third terminal of the fourth winding,
the first terminal is a dotted terminal of the second winding and the fourth terminal is a dotted terminal of the fourth winding, or
the second terminal is a dotted terminal of the second winding and the third terminal is a dotted terminal of the fourth winding.

3. The apparatus of claim 1, further comprising:
a first switching circuit electrically coupled between the first transformer and the controller; and
a second switching circuit electrically coupled between the second transformer and the controller,
wherein the controller is configured to control the first current by supplying a first control signal to the first switching circuit, and control the second current by supplying a second control signal to the second switching circuit.

4. The apparatus of claim 1, further comprising:
an output terminal;
a reference potential terminal;
a first rectifying element and a second rectifying element electrically coupled at a first node in series with each other between the output terminal and the reference potential terminal;
a third rectifying element and a fourth rectifying element electrically coupled at a second node in series with each other between the output terminal and the reference potential terminal; and
a fifth rectifying element and a sixth rectifying element electrically coupled at a third node in series with each other between the output terminal and the reference potential terminal,
wherein the second winding of the first transformer comprises a first terminal coupled to the first node and a second terminal coupled to the third node, and
wherein the fourth winding of the second transformer comprises a third terminal coupled to the third node and a fourth terminal coupled to the second node.

5. The apparatus of claim 4, further comprising:
an input terminal;
a first transistor and a second transistor electrically coupled at a first intermediate node in series with each other between the input terminal and the reference potential terminal; and
a third transistor and a fourth transistor electrically coupled at a second intermediate node in series with each other between the input terminal and the reference potential terminal,
wherein the first winding of the first transformer is electrically coupled to the first intermediate node, and the third winding of the second transformer is electrically coupled to the second intermediate node.

6. The apparatus of claim 5, further comprising:
a first capacitor and a second capacitor electrically coupled at a third intermediate node in series with each other between the input terminal and the reference potential terminal; and
a third capacitor and a fourth capacitor electrically coupled at a fourth intermediate node in series with each other between the input terminal and the reference potential terminal,
wherein the first winding of the first transformer is further electrically coupled to the third intermediate node, and the third winding of the second transformer is further electrically coupled to the fourth intermediate node.

7. The apparatus of claim 6, wherein:
the first winding of the first transformer comprises a dotted terminal electrically coupled to the first intermediate node and an opposite terminal electrically coupled to the third intermediate node, and
the third winding of the second transformer comprises a dotted terminal electrically coupled to the second intermediate node and an opposite terminal electrically coupled to the fourth intermediate node.

8. The apparatus of claim 6, wherein:
the first winding of the first transformer comprises a dotted terminal electrically coupled to the third intermediate node and an opposite terminal electrically coupled to the first intermediate node, and
the third winding of the second transformer comprises a dotted terminal electrically coupled to the fourth intermediate node and an opposite terminal electrically coupled to the second intermediate node.

9. The apparatus of claim 6, further comprising:
a filter comprising an output capacitor electrically coupled between the output terminal and the reference potential terminal.

10. The apparatus of claim 9, further comprising:
a first inductor electrically coupled between the first intermediate node and the first winding; and
a second inductor electrically coupled between the second intermediate node and the third winding.

11. The apparatus of claim 9, further comprising:
a first inductor electrically coupled between the third intermediate node and the first winding; and
a second inductor electrically coupled between the fourth intermediate node and the third winding.

12. The apparatus of claim 5, wherein the controller is further configured to:
control the first current and the second current to flow in a first direction by turning on the first transistor and the third transistor and turning off the second transistor and the fourth transistor;
control the first current and the second current to flow in a second direction opposite to the first direction by turning off the first transistor and the third transistor and turning on the second transistor and the fourth transistor;
control the first current to flow in the first direction and the second current to flow in the second direction by turning on the first transistor and the fourth transistor and turning off the second transistor and the third transistor; or
control the first current to flow in the second direction and the second current to flow in the first direction by turning off the first transistor and the fourth transistor and turning on the second transistor and the third transistor.

13. The apparatus of claim 5, further comprising:
a fifth transistor and a sixth transistor electrically coupled at a third intermediate node in series with each other between the input terminal and the reference potential terminal; and
a seventh transistor and an eighth transistor electrically coupled at a fourth intermediate node in series with each other between the input terminal and the reference potential terminal,
wherein the first winding of the first transformer is further electrically coupled to the third intermediate node, and the third winding of the second transformer is further electrically coupled to the fourth intermediate node.

14. The apparatus of claim 13, wherein the controller is further configured to:
control the first current and the second current to flow in a first direction by turning on the first transistor, the third transistor, the sixth transistor and the eighth transistor and turning off the second transistor, the fourth transistor, the fifth transistor and the seventh transistor;
control the first current and the second current to flow in a second direction opposite to the first direction by turning off the first transistor, the third transistor, the sixth transistor and the eighth transistor and turning on the second transistor, the fourth transistor, the fifth transistor and the seventh transistor;
control the first current to flow in the first direction and the second current to flow in the second direction by turning on the first transistor, the fourth transistor, the sixth transistor and the seventh transistor and turning off the second transistor, the third transistor, the fifth transistor and the eighth transistor; or
control the first current to flow in the second direction and the second current to flow in the first direction by turning off the first transistor, the fourth transistor, the sixth transistor and the seventh transistor and turning on the second transistor, the third transistor, the fifth transistor and the eighth transistor.

15. The apparatus of claim 4, further comprising:
an input terminal;
an intermediate reference terminal;
a first transistor and a second transistor electrically coupled at a first intermediate node in series with each other between the input terminal and the intermediate reference terminal; and
a third transistor and a fourth transistor electrically coupled at a second intermediate node in series with each other between the intermediate reference terminal and the reference potential terminal,
wherein the first winding of the first transformer is electrically coupled to the first intermediate node, and the third winding of the second transformer is electrically coupled to the second intermediate node.

16. The apparatus of claim 15, further comprising:
a first capacitor and a second capacitor electrically coupled at a third intermediate node in series with each other between the input terminal and the intermediate reference terminal; and
a third capacitor and a fourth capacitor electrically coupled at a fourth intermediate node in series with each other between the intermediate reference terminal and the reference potential terminal,
wherein the first winding of the first transformer is further electrically coupled to the third intermediate node, and the third winding of the second transformer is further electrically coupled to the fourth intermediate node.

17. The apparatus of claim 16, further comprising:
a first diode electrically coupled in parallel with the first capacitor;
a second diode electrically coupled in parallel with the second capacitor;
a third diode electrically coupled in parallel with the third capacitor; and
a fourth diode electrically coupled in parallel with the fourth capacitor.

18. The apparatus of claim 15, further comprising:
a fifth transistor and a sixth transistor electrically coupled at a third intermediate node in series with each other between the input terminal and the intermediate reference terminal; and
a seventh transistor and an eighth transistor electrically coupled at a fourth intermediate node in series with each other between the intermediate reference terminal and the reference potential terminal,
wherein the first winding of the first transformer is further electrically coupled to the third intermediate node, and the third winding of the second transformer is further electrically coupled to the fourth intermediate node.

19. The apparatus of claim 4, wherein the first winding of the first transformer comprises a first sub winding and a second sub winding, and the third winding of the second transformer comprises a third sub winding and a fourth sub winding, the apparatus further comprising:
an input terminal;
a first transistor electrically coupled between the reference potential terminal and the first sub winding, the first sub winding comprising a dotted terminal electrically coupled to the input terminal and an opposite terminal electrically coupled to the first transistor;
a second transistor electrically coupled between the reference potential terminal and the second sub winding, the second sub winding comprising a dotted terminal electrically coupled to the second transistor and an opposite terminal electrically coupled to the input terminal;
a third transistor electrically coupled between the reference potential terminal and the third sub winding, the third sub winding comprising a dotted terminal electrically coupled to the input terminal and an opposite terminal electrically coupled to the third transistor; and
a fourth transistor electrically coupled between the reference potential terminal and the fourth sub winding, the fourth sub winding comprising a dotted terminal electrically coupled to the fourth transistor and an opposite terminal electrically coupled to the input terminal.

20. The apparatus of claim 4, wherein the first winding of the first transformer comprises a first sub winding and a second sub winding, and the third winding of the second transformer comprises a third sub winding and a fourth sub winding, the apparatus further comprising:
an input terminal;
an intermediate reference terminal;
a first transistor electrically coupled between the intermediate reference terminal and the first sub winding, the first sub winding comprising a dotted terminal electrically coupled to the input terminal and an opposite terminal electrically coupled to the first transistor;
a second transistor electrically coupled between the intermediate reference terminal and the second sub winding, the second sub winding comprising a dotted terminal electrically coupled to the second transistor and an opposite terminal electrically coupled to the input terminal;
a third transistor electrically coupled between the reference potential terminal and the third sub winding, the third sub winding comprising a dotted terminal electrically coupled to the intermediate reference terminal and an opposite terminal electrically coupled to the third transistor; and
a fourth transistor electrically coupled between the reference potential terminal and the fourth sub winding, the fourth sub winding comprising a dotted terminal electrically coupled to the fourth transistor and an opposite terminal electrically coupled to the intermediate reference terminal.

21. The apparatus of claim 4, further comprising:
an input terminal;
a first DC-to-DC converter circuit electrically coupled in series with between the input terminal and the reference potential terminal, and electrically coupled to the first winding of the first transformer; and
a second DC-to-DC converter circuit electrically coupled in series between the input terminal and the reference potential terminal, and electrically coupled to the third winding of the second transformer.

22. The apparatus of claim 4, further comprising:
an input terminal;
an intermediate reference terminal;
a first DC-to-DC converter circuit electrically coupled in series between the input terminal and the intermediate reference terminal, and electrically coupled to the first winding of the first transformer; and
a second DC-to-DC converter circuit electrically coupled in series with between the intermediate reference terminal and the reference potential terminal, and electrically coupled to the third winding of the second transformer.

23. The apparatus of claim 4, further comprising:
a filter comprising:
an output capacitor electrically coupled between the output terminal and the reference potential terminal; and
an inductor electrically coupled between the output terminal and a common node of cathodes of the first rectifying element, the third rectifying element and the fifth rectifying element.

24. The apparatus of claim 4, further comprising:
a filter comprising:
an output capacitor electrically coupled between the output terminal and the reference potential terminal; and
an inductor electrically coupled between the output terminal and a common node of anodes of the second rectifying element, the fourth rectifying element and the sixth rectifying element.

25. A method for DC-to-DC conversion, comprising:
controlling a first current in a primary winding of a first transformer and a second current in a primary winding of a second transformer to flow in a first pattern, such that a secondary winding of the first transformer and a secondary winding of the second transformer are electrically coupled in serial to output a first voltage; and
controlling the first current and the second current to flow in a second pattern different from the first pattern, such that the secondary winding of the first transformer and the secondary winding of the second transformer are electrically coupled in parallel to output a second voltage lower than the first voltage,
wherein controlling the first current and the second current to flow in the first pattern comprises controlling the first current and the second current to flow in different directions, and
wherein controlling the first current and the second current to flow in the second pattern comprises controlling the first current and the second current to flow in a same direction.

26. The method of claim 25, wherein:
controlling the first current comprises supplying a first control signal to a first switching circuit electrically coupled to the primary winding of the first transformer, and
controlling the second current comprises supplying a second control signal to a second switching circuit electrically coupled to the primary winding of the second transformer.

27. The method of claim 25, further comprising:
controlling the first current and the second current to flow in a first direction by turning on a first high-side transistor electrically coupled to the primary winding of the first transformer and a second high-side transistor electrically coupled to the primary winding of the second transformer, and turning off a first low-side transistor electrically coupled to the primary winding of the first transformer and a second low-side transistor electrically coupled to the primary winding of the second transformer;
controlling the first current and the second current to flow in a second direction opposite to the first direction by turning off the first high-side transistor and the second high-side transistor and turning on the first low-side transistor and the second low-side transistor;
controlling the first current to flow in the first direction and the second current to flow in the second direction by turning on the first high-side transistor and the second low-side transistor and turning off the first low-side transistor and the second high-side transistor; or
controlling the first current to flow in the second direction and the second current to flow in the first direction by turning off the first high-side transistor and the second low-side transistor and turning on the first low-side transistor and the second high-side transistor.

28. A computer-readable medium having computer-readable instructions stored thereon, the computer-readable instructions, when executed, causing a device to perform the method according to claim 25.

* * * * *